(12) United States Patent
Bhagwat et al.

(10) Patent No.: US 7,216,365 B2
(45) Date of Patent: May 8, 2007

(54) AUTOMATED SNIFFER APPARATUS AND METHOD FOR WIRELESS LOCAL AREA NETWORK SECURITY

(75) Inventors: Pravin Bhagwat, Kendall Park, NJ (US); Shantanu Gogate, Pune (IN); David C. King, Menlo Park, CA (US)

(73) Assignee: AirTight Networks, Inc., Mountain View, CA (US)

( * ) Notice: Subject to any disclaimer, the term of this patent is extended or adjusted under 35 U.S.C. 154(b) by 105 days.

(21) Appl. No.: 11/123,848

(22) Filed: May 6, 2005

(65) Prior Publication Data

US 2006/0002331 A1 Jan. 5, 2006

Related U.S. Application Data

(63) Continuation-in-part of application No. 11/086,266, filed on Mar. 21, 2005, now abandoned, and a continuation-in-part of application No. 10/931,585, filed on Aug. 31, 2004.

(60) Provisional application No. 60/543,631, filed on Feb. 11, 2004.

(51) Int. Cl.
*G06F 11/00* (2006.01)
*G06F 12/14* (2006.01)
*G06F 12/16* (2006.01)
*G06F 15/18* (2006.01)
*G08B 23/00* (2006.01)

(52) U.S. Cl. .................. 726/23; 370/395.3
(58) Field of Classification Search .......... 726/23, 726/22
See application file for complete search history.

(56) References Cited

U.S. PATENT DOCUMENTS

| | | | |
|---|---|---|---|
| 6,647,418 B1 | 11/2003 | Maria et al. | |
| 6,701,432 B1 | 3/2004 | Deng et al. | |
| 6,735,702 B1 | 5/2004 | Vavatkar et al. | |
| 6,753,702 B2 | 6/2004 | Mizuno et al. | |
| 2003/0126468 A1 | 7/2003 | Markham | |

(Continued)

FOREIGN PATENT DOCUMENTS

WO    WO 2004-095192    11/2004

OTHER PUBLICATIONS

Yang et al., Intrusion Detection Solution to WLANs, Software Base, Civil Aviation University of China, Tianjin, China, *IEEE 6th Circuits and Systems (CAS) Symposium on Emerging Technologies: Mobile and Wireless Communication*, Shanghai, China, May 31-Jun. 2, 2004, vol. 2, pp. 553-556.

(Continued)

*Primary Examiner*—Kambiz Zand
*Assistant Examiner*—Jason K. Gee
(74) *Attorney, Agent, or Firm*—Townsend and Townsend and Crew LLP

(57) ABSTRACT

A method for protecting local area networks within a selected local geographic region (e.g. office, apartment, building, coffee shop, hot-spot etc.) from wireless attacks, using a wireless sniffer apparatus. The method includes placing one or more wireless sniffer apparatus spatially to provide substantial radio coverage over at least a portion of the selected local geographic region comprising one or more local area networks. Moreover the method includes coupling one or more of the wireless sniffer apparatus to one or more of the local area networks.

53 Claims, 16 Drawing Sheets

U.S. PATENT DOCUMENTS

| | | | |
|---|---|---|---|
| 2003/0135762 A1* | 7/2003 | Macaulay | 713/201 |
| 2003/0149891 A1* | 8/2003 | Thomsen | 713/201 |
| 2003/0217289 A1 | 11/2003 | Ammon et al. | |
| 2003/0219008 A1 | 11/2003 | Hraster | |
| 2003/0221006 A1 | 11/2003 | Kuan et al. | |
| 2003/0233567 A1 | 12/2003 | Lynn et al. | |
| 2003/0236990 A1 | 12/2003 | Hraster et al. | |
| 2004/0003285 A1 | 1/2004 | Whelan et al. | |
| 2004/0008652 A1 | 1/2004 | Tanzella et al. | |
| 2004/0078717 A1 | 4/2004 | Allred et al. | |
| 2004/0098485 A1 | 5/2004 | Larson et al. | |
| 2004/0098610 A1 | 5/2004 | Hraster | |
| 2004/0107219 A1 | 6/2004 | Rosenberger | |
| 2004/0111640 A1 | 6/2004 | Baum | |
| 2004/0143751 A1 | 7/2004 | Peikari | |
| 2005/0111460 A1* | 5/2005 | Sahita | 370/395.3 |
| 2005/0128989 A1 | 6/2005 | Bhagwat et al. | |

OTHER PUBLICATIONS

Hatami et al., In-Building Intruder Detection for WLAN Access, Center for Wireless Information Network Studies, Worcester Polytechnic Institute (WPI), MA, USA, 2004 *Position Location and Navigation Symposium,* Apr. 26-29, 2004, pp. 592-597.

Zhang et al., Intrusion Detection Techniques for Mobile Wireless Networks, *Wireless Networks,* vol. 9, Issue 5 (Sep. 2003), pp. 545-556.

Bellardo et al., Denial-of-Service Attacks: Real Vulnerabilites and Practical Solutions, Department of Computer and Science Engineering, University of California at San Diego, Proceedings of the USENIX Security Symposium, Washington, DC, Aug. 2003.

Lim et al., Wireless Intrusion Detection and Response, IEEE., Proceedings of the 2003 IEEE Workshop on Information Assurance United States Military Academy, West Point, NY, Jun. 2003.

* cited by examiner

AUTOMATED SNIFFER APPARATUS AND METHOD FOR WIRELESS LOCAL AREA NETWORK SECURITY

CROSS-REFERENCE TO RELATED APPLICATIONS

This present application claims priority to and is a continuation in part to U.S. application Ser. No. 11/086,266, filed on Mar. 21, 2005 now abandoned, which claims priority to and is a continuation in part to U.S. application Ser. No. 10/931,585, filed on Aug. 31, 2004, which claims priority to U.S. Provisional Application No. 60/543,631, titled "An Automated Method and an RF Sensor System for Wireless Unauthorized Transmission, Intrusion Detection and Prevention," filed Feb. 11, 2004, commonly assigned, and hereby incorporated by reference for all purposes.

This present application is also related to U.S. application Ser. No. 10/931,926 filed on Aug. 31, 2004, commonly assigned, and hereby incorporated by reference for all purposes which claims priority to U.S. Provisional Application No. 60/543,631, titled "An Automated Method and an RF Sensor System for Wireless Unauthorized Transmission, Intrusion Detection and Prevention," filed Feb. 11, 2004, commonly assigned, and hereby incorporated by reference for all purposes.

BACKGROUND OF THE INVENTION

The present invention relates generally to wireless computer networking techniques. More particularly, the invention provides a sniffer apparatus and method for providing intrusion detection for local area wireless networks according to a specific embodiment. Merely by way of example, the invention has been applied to a computer networking environment based upon the IEEE 802.11 family of standards, commonly called "WiFi." But it would be recognized that the invention has a much broader range of applicability. For example, the invention can be applied to Ultra Wide Band ("UWB"), IEEE 802.16 commonly known as "WiMAX", Bluetooth, and others.

Computer systems proliferated from academic and specialized science applications to day to day business, commerce, information distribution and home applications. Such systems include personal computers, which are often called "PCs" for short, to large mainframe and server class computers. Powerful mainframe and server class computers run specialized applications for banks, small and large companies, e-commerce vendors and governments. Smaller personal computers can be found in many if not all offices, homes, and even local coffee shops. These computers interconnect with each other through computer communication networks based on packet switching technology such as the Internet protocol or IP. The computer systems located within a specific local geographic area such as office, home or other indoor and outdoor premises interconnect using a Local Area Network, commonly called, LAN. Ethernet is by far the most popular networking technology for LANs. The LANs interconnect with each other using a Wide Area Network called "WAN" such as the famous Internet. Although much progress occurred with computers and networking, we now face a variety of security threats on many computing environments from the hackers connected to the computer network. The application of wireless communication to computer networking further accentuates these threats.

As merely an example, the conventional LAN is usually deployed using an Ethernet based infrastructure comprising cables, hubs switches, and other elements. A number of connection ports (e.g., Ethernet ports) are used to couple various computer systems to the LAN. A user can connect to the LAN by physically attaching a computing device such as laptop, desktop or handheld computer to one of the connection ports using physical wires or cables. Other computer systems such as database computers, server computers, routers and Internet gateways also connect to the LAN to provide specific functionalities and services. Once physically connected to the LAN, the user often accesses a variety of services such as file transfer, remote login, email, WWW, database access, and voice over IP. Security of the LAN often occurs by controlling access to the physical space where the LAN connection ports reside.

Although conventional wired networks using Ethernet technology proliferated, wireless communication technologies are increasing in popularity. That is, wireless communication technologies wirelessly connect users to the computer communication networks. A typical application of these technologies provides wireless access to the local area network in the office, home, public hot-spots, and other geographical locations. As merely an example, the IEEE 802.11 family of standards, commonly called WiFi, is the common standard for such wireless application. Among WiFi, the 802.11b standard-based WiFi often operates at 2.4 GHz unlicensed radio frequency spectrum and offers wireless connectivity at speeds up to 11 Mbps. The 802.11g compliant WiFi offers even faster connectivity at about 54 Mbps and operates at 2.4 GHz unlicensed radio frequency spectrum. The 802.11a provides speeds up to 54 Mbps operating in the 5 GHz unlicensed radio frequency spectrum. The WiFi enables a quick and effective way of providing wireless extension to the existing LAN.

In order to provide wireless extension of the LAN using WiFi, one or more WiFi access points (APs) connect to the LAN connection ports either directly or through intermediate equipment such as WiFi switch. A user now wirelessly connects to the LAN using a device equipped with WiFi radio, commonly called wireless station, that communicates with the AP. The connection is free from cable and other physical encumbrances and allows the user to "Surf the Web" or check e-mail in an easy and efficient manner. Unfortunately, certain limitations still exist with WiFi. That is, the radio waves often cannot be contained in the physical space bounded by physical structures such as the walls of a building. Hence, wireless signals often spill outside the area of interest. Unauthorized users can wirelessly connect to the AP and hence gain access to the LAN from the spillage areas such as the street, parking lot, and neighbor's premises. Consequently, the conventional security measure of controlling access to the physical space where the LAN connection ports are located is now inadequate.

In order to prevent unauthorized access to the LAN over WiFi, the AP implements one or more of a variety of techniques. For example, the user is required to carry out authentication handshake with the AP (or a WiFi switch that resides between the AP and the existing LAN) before being able to connect to the LAN. Examples of such handshake are Wireless Equivalent Privacy (WEP) based shared key authentication, 802.1x based port access control, 802.11i based authentication. The AP can provide additional security measures such as encryption, firewall. Other techniques also exist to enhance security of the LAN over WiFi.

Despite these measures, many limitations still exist. As merely an example, a threat of an unauthorized AP being connected to the LAN often remains with the LANs. The unauthorized AP creates a security vulnerability. The unauthorized AP allows wireless intruders to connect to the LAN through itself. That is, the intruder accesses the LAN and any proprietary information on computers and servers on the LAN without the knowledge of the owner of the LAN. Soft APs, ad hoc networks, and misconfigured APs connected to the LAN also pose similar threats. As another example, external wireless devices can launch security attacks on wireless LAN. Such attacks include denial of service (DoS) attack, Honeypot attack, Evil Twin attack and others. Appropriate security mechanisms are thus needed to protect the LAN resources from wireless intruders.

Accordingly, techniques for improving security for local area network environments are highly desirable.

BRIEF SUMMARY OF THE INVENTION

According to the present invention, techniques directed to wireless computer networking are provided. More particularly, the invention provides a sniffer apparatus and method for providing intrusion detection for local area wireless networks according to a specific embodiment. Merely by way of example, the invention has been applied to a computer networking environment based upon the IEEE 802.11 family of standards, commonly called "WiFi." But it would be recognized that the invention has a much broader range of applicability. For example, the invention can be applied to UWB, WiMAX (802.16), Bluetooth, and others.

In a specific embodiment, the invention provides an apparatus for intrusion detection in wireless communication networks. The apparatus comprises a single housing (e.g. a box, an appliance etc.). The housing comprises a processing unit (e.g. one or more processors etc.). The housing comprises one or more wireless network interface devices (e.g. WiFi network interface devices) coupled to the processing unit. Moreover, the housing comprises at least one network interface device (e.g. Ethernet network interface device, Bluetooth network interface device, WiFi network interface device etc.) coupled to the processing unit. The at least one network interface device is adapted to operably couple the housing to a local area network to be protected from intrusion. The housing comprises one or more memories coupled to the processing unit. The one or more memories include one or more codes. One or more of the codes is directed to perform a process for detection of a wireless activity within a selected local geographic region. The wireless activity is preferably derived from at least one authorized device or at least an other device. The wireless activity is preferably received by the apparatus (e.g. for the purpose of detection) using one or more of the wireless network interface devices. One or more of the codes is directed to receiving at least identity information (e.g. MAC address) associated with the wireless activity from the detection, process in a classification process. One or more of the codes is directed to labeling (e.g. automatically) the identity information into at least one of a plurality of categories in the classification process. In one embodiment, the plurality of categories include at least authorized, unauthorized and external. In another embodiment, the plurality of categories include at least authorized and external. One or more of the codes is directed to generating indication associated with the identity information. The codes directed to perform the process for detection of the wireless activity, the receiving the identity information, the labeling the identity information and the generating indication are preferably all entirely executed within the processing unit.

In an alternative specific embodiment, the invention provides a method for protecting local area networks within a selected local geographic region (e.g. office, apartment, building, coffee shop, hot-spot etc.) from wireless attacks, using one or more of the aforementioned apparatus (e.g. wireless sniffer apparatus). The method includes placing one or more wireless sniffer apparatus spatially to provide substantial radio coverage over at least a portion of the selected local geographic region. Preferably the selected local geographic region comprises one or more local area networks to be protected. Moreover the method includes coupling one or more of the wireless sniffer apparatus to one or more of the local area networks.

Certain advantages and/or benefits may be achieved using the present invention. In one embodiment, the invention provides for a wireless sniffer apparatus that can protect local area networks from wireless attacks. Advantageously, the wireless sniffer apparatus can operate as standalone device (e.g. free from interaction with a server device). According to specific embodiment, the invention provides a sniffer apparatus that can be operably coupled to local area network and thereafter protects the local area network from unauthorized access in a standalone fashion. In an alternative specific embodiment, the invention provides a sniffer apparatus that can be operably coupled to local area network and thereafter protects the local area network from unauthorized access points that can lure authorized users into connecting to them (e.g. to steal confidential information, cause disruption to wireless connection etc.). In some embodiments, the wireless sniffer apparatus can send indication associated with the detected wireless activity to other computer systems (e.g. using electronic mail). Depending upon the embodiment, one or more of these benefits may be achieved. These and other benefits will be described in more throughout the present specification and more particularly below.

Other features and advantages of the invention will become apparent through the following detailed description, the drawings, and the claims.

DETAILED DESCRIPTION OF THE INVENTION

According to the present invention, techniques for wireless computer networking are provided. More particularly, the invention provides a sniffer apparatus and method for providing intrusion detection for local area wireless networks according to a specific embodiment. Merely by way of example, the invention has been applied to a computer networking environment based upon the IEEE 802.11 family of standards, commonly called "WiFi." But it would be recognized that the invention has a much broader range of applicability. For example, the invention can be applied to UWB, WiMAX (802.16), Bluetooth, and others.

Figure 1:
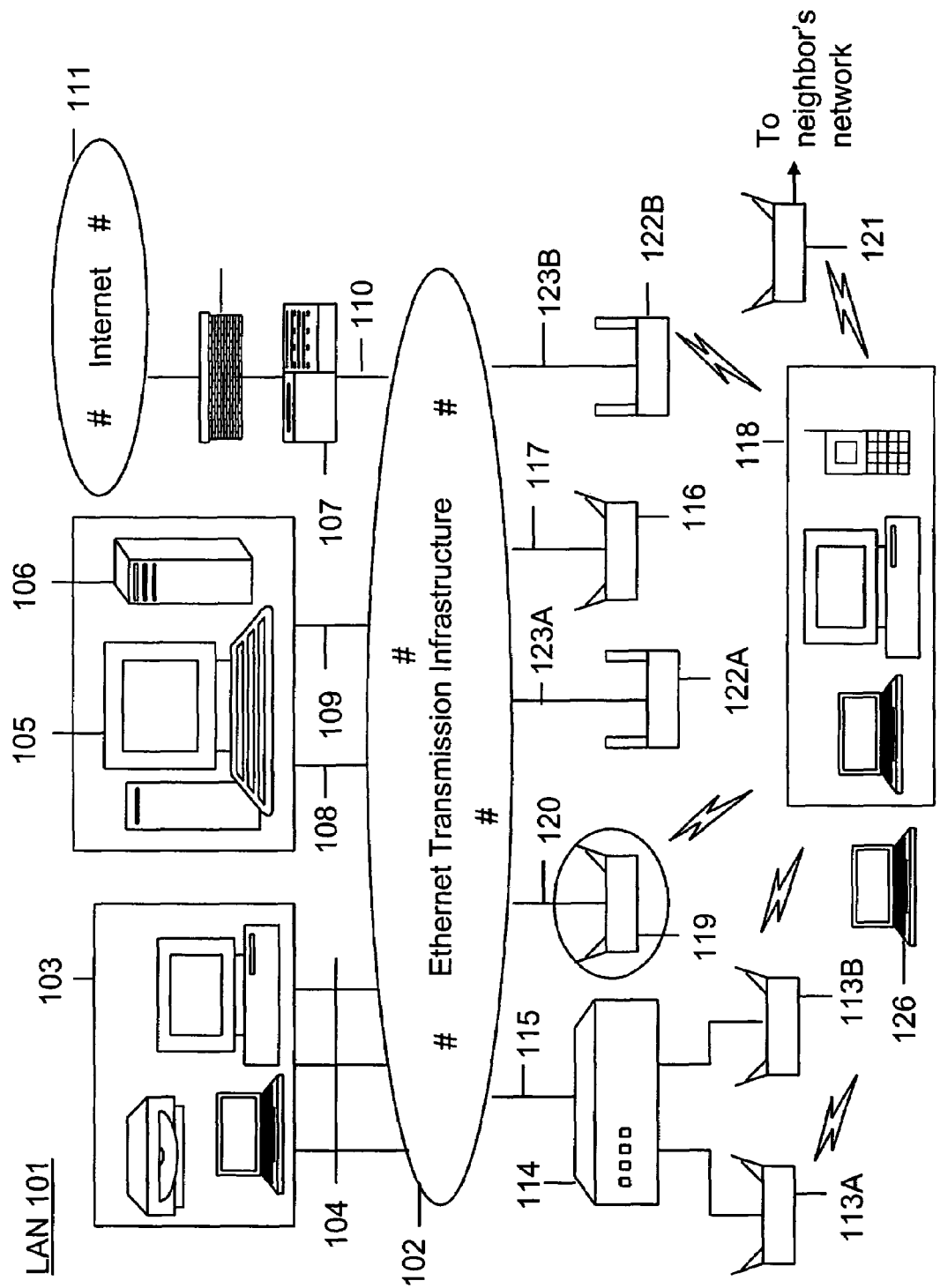
FIG. 1 shows a simplified LAN architecture that supports wireless intrusion detection according to an embodiment of the present invention.

FIG. 1 shows the LAN architecture that supports the intrusion detection according to one embodiment of the invention. This diagram is merely an example, which should not unduly limit the scope of the claims herein. One of ordinary skill in the art would recognize other variations, modifications, and alternatives. As shown in FIG. 1, the core transmission infrastructure 102 for the LAN 101 comprises of Ethernet cables, hubs and switches. Other devices may also be included. Plurality of connection ports (e.g., Ethernet ports) are provided for the various computer systems to be able to connect to the LAN. One or more end user devices 103 such as desktop computers, notebook computers, telemetry sensors etc. are connected to the LAN 101 via one or more connection ports 104 using wires (Ethernet cable) or other suitable devices. Other computer systems that provide specific functionalities and services are also connected to the LAN. For example, one or more database computers 105 may be connected to the LAN via one or more connection ports 108. Examples of information stored in database computers include customer accounts, inventory, employee accounts, financial information, etc. One or more server computers 106 may be connected to the LAN via one or more connection ports 109. Examples of services provided by server computers include database access, email storage, HTTP proxy service, DHCP service, SIP service, authentication, network management, etc. The router 107 is connected to the LAN via connection port 110 and it acts as a gateway between the LAN 101 and the Internet 111. The firewall/VPN gateway 112 protects computers in the LAN against hacking attacks from the Internet 111. It may additionally also enable remote secure access to the LAN.

WiFi is used to provide wireless extension of the LAN. For this, one or more authorized WiFi APs 113A, 113B are connected to the LAN via WiFi switch 114. The WiFi switch is connected to the LAN connection port 115. The WiFi switch enables offloading from APs some of the complex procedures for authentication, encryption, QoS, mobility, etc., and also provides centralized management functionality for APs, making overall WiFi system scalable for large scale deployments. The WiFi switch may also provide additional functionalities such as firewall. One or more authorized WiFi AP 116 may also be directly connected to the LAN connection port 117. In this case AP 116 may itself perform necessary security procedures such as authentication, encryption, firewall, etc. One or more end user devices 118 such as desktop computers, laptop computers, PDAs equipped with WiFi radio can now wirelessly connect to the LAN via authorized APs 113A, 113B and 116. Although WiFi has been provided according to the present embodiment, there can also be other types of wireless network formats such as UWB, WiMax, Bluetooth, and others.

One or more unauthorized APs can be connected to the LAN. The figure shows unauthorized AP 119 connected to the LAN connection port 120. The unauthorized AP may not employ the right security policies. Also traffic through this AP may bypass security policy enforcing elements such as WiFi switch 114 or firewall/VPN gateway 112. The AP 119 thus poses a security threat as intruders such as wireless station 126 can connect to the LAN and launch variety of attacks through this AP. According to a specific embodiment, the unauthorized AP can be a rogue AP, a misconfigured AP, a soft AP, and the like. A rougue AP can be a commodity AP such as the one available openly in the market that is brought in by the person having physical access to the facility and connected to the LAN via the LAN connection port without the permission of the network administrator. A misconfigured AP can be the AP otherwise allowed by the network administrator, but whose security parameters are, usually inadvertently, incorrectly configured. Such an AP can thus allow wireless intruders to connect to it. Soft AP is usually a "WiFi" enabled computer system connected to the LAN connection port that also functions as an AP under the control of software. The software is either deliberately run on the computer system or inadvertently in the form of a virus program.

The figure also shows neighbor's AP 121 whose radio coverage spills into the area covered by LAN. The AP 121 is however not connected to the concerned LAN 101. In one embodiment, this AP is harmless from the intrusion standpoint. For example, this AP can be an AP in the neighboring office, an AP is the laboratory not connected to the concerned LAN but used for standalone development and/or experimentation, an AP on the street providing free "WiFi" access to passersby and other APs, which co-exist with the LAN and share the airspace without any significant and/or harmful interferences. In alternative embodiment, this AP 121 can be malicious AP. For example, this AP can launch wireless attacks on the wireless users of LAN 101. As merely an example, the AP 121 can lure one or more of the authorized users 118 into connecting to it (e.g. by transmitting strong radio signal, advertising the same SSID as authorized APs, disconnecting the authorized users from authorized APs by sending spoofed deauthentication or disassociation message etc.). The users 118 can then unwittingly provide confidential information (e.g. username, password etc.) to the AP 121. As another example, the AP 121 can insert itself as man-in-the-middle. Examples of such attacks include Honeypot AP attack, Evil Twin attack, MonkeyJack attack, hotspotter tool etc.

A WiFi AP delivers data packets between the wired LAN and the wireless transmission medium. Typically, the AP performs this function either by acting as a layer 2 bridge or as a network address translator (NAT). The layer 2 bridge type AP simply transmits the Ethernet packet received on its wired interface to the wireless link after translating it to 802.11 style packet and vice versa. The NAT AP on the other hand acts as a layer 3 (IP) router that routes IP packets received on its wired interface to the stations connected to its wireless interface and vice versa. The wired side and wireless side interfaces of the NAT AP thus usually reside on different subnets.

The intrusion detection system according to the present invention is provided to protect the LAN 101 from unauthorized APs and/or wireless intruders. The system involves one or more sensor devices 122A, 122B (i.e., sniffers) placed throughout a geographic region or a portion of geographic region including the connection points to the LAN 101. The sniffer is able to monitor the wireless activity in the selected geographic region. For example, the sniffer listens to the radio channel and capture packets being transmitted on the channel. The sniffer cycles through the radio channels on which wireless communication can take place. On each radio channel, it waits and listens for any ongoing transmission. In one embodiment, the sniffer is able operate on plurality of radio channels simultaneously. Whenever transmission is detected, the relevant information about that transmission is collected and recorded. This information comprises of all or a subset of information that can be gathered from various fields in the captured packet such as 802.11 MAC (medium access control) header, 802.2 LLC (i.e., logical link control) header, IP header, transport protocol (e.g., TCP, UDP, HTTP, RTP etc.) headers, packet size, packet payload and other fields. Receive signal strength (i.e., RSSI) may also be recorded. Other information such as the day and the time of the day when said transmission was detected may also be recorded.

According to a specific embodiment, the sniffer device can be any suitable receiving/transmitting device capable of detecting wireless activity. As merely an example, the sniffer often has a smaller form factor. The sniffer device has a processor, a flash memory (where the software code for sniffer functionality resides), a RAM, two 802.11a/b/g wireless network interface cards (NICs), one Ethernet port (with optional power over Ethernet or POE), a serial port, a power input port, a pair of dual-band (2.4 GHz and 5 GHz) antennas, and at least one status indicator light emitting diode. The sniffer can be built using the hardware platform similar to one used to built wireless access point, although functionality and software will be different for a sniffer device. Of course, one of ordinary skill in the art would recognize other variations, modifications, and alternatives. Further details of the sniffers are provided throughout the present specification and more particularly below.

One or more sniffers 122A and 122B may also be provided with radio transmit interface which is useful to perform intrusion prevention procedures, i.e., to perform preventive action against detected intrusion. In one specific embodiment, the sniffer is a dual slot device which has two wireless NICs. These NICs can be used in a variety of combinations, for example both for monitoring, both form transmitting, one for monitoring and the other for transmitting etc., under the control of software. In another specific embodiment, the sniffer has only one wireless NIC. The same NIC is shared in a time division multiplexed fashion to carry out monitoring as well as defense against intrusion. The radio transmit interface of the sniffer is also used to perform certain other transmission procedures according to some embodiments of the method of invention, for example transmission of market packet in some embodiments of the LAN connectivity test, transmission of active probe packets, and the like. Each sniffer also has Ethernet NIC using which it is connected to the connection port 123 of the LAN. The sniffers can be spatially disposed at appropriate locations in the geographic area to be monitored for intrusion by using one or more of heuristics, strategy and calculated guess. Alternatively, a more systematic approach using an RF (radio frequency) planning tool is used to determine physical locations where said sniffers need to be deployed according to an alternative embodiment of the present invention.

In a specific embodiment, the sniffer device captures wireless activity. Such wireless activity includes, among others, transmission of control, management or data packet between an AP and a wireless station or among wireless stations, and communication for establishing wireless connection between an AP and a wireless station often called association. Depending upon the embodiment, the invention also provides certain methods for monitoring wireless activity in selected geographic regions.

According to a specific embodiment, the present invention provides a method for monitoring a wireless communication space (e.g., office space, home, apartments, government buildings, warehouses, hot-spots, commercial facilities etc.) occupied by one or more computer networks which may be outlined as follows.

1. Provide a geographic region;
2. Operate a local area network in a selected portion of the geographic region;
3. Monitor a selected local geographic region in the geographic region using one or more sniffer devices;
4. Detect a wireless activity from at least one authorized device, at least one unauthorized device, or at least one external device, within the selected local geographic region using at least one of the sniffer devices from the one or more sniffer devices;
5. Receive at least identity information (e.g., source information, destination information, MAC address) associated with the wireless activity in a classification process;
6. Label the identity information into at least one of a plurality of categories;
7. Transfer an indication associated with the identify information to a prevention process; and
8. Perform other steps, as desired.

The above sequence of steps provides methods according to an embodiment of the present invention. As shown, the method uses a combination of steps including a way of detecting for an intrusion using wireless computer networks. In preferred embodiments, the present invention also includes an automated method for transferring an indication of an intrusion to a prevention process, which would preferably stop the intruding device before any security problems or the like. Many other methods and system are also included. Of course, other alternatives can also be provided where steps are added, one or more steps are removed, or one or more steps are provided in a different sequence without departing from the scope of the claims herein. Additionally, the various methods can be implemented using a computer code or codes in software, firmware, hardware, or any combination of these. Depending upon the embodiment, there can be other variations, modifications, and alternatives. Further details of the present method can be found throughout the present specification and more particularly below.

Figure 1A:
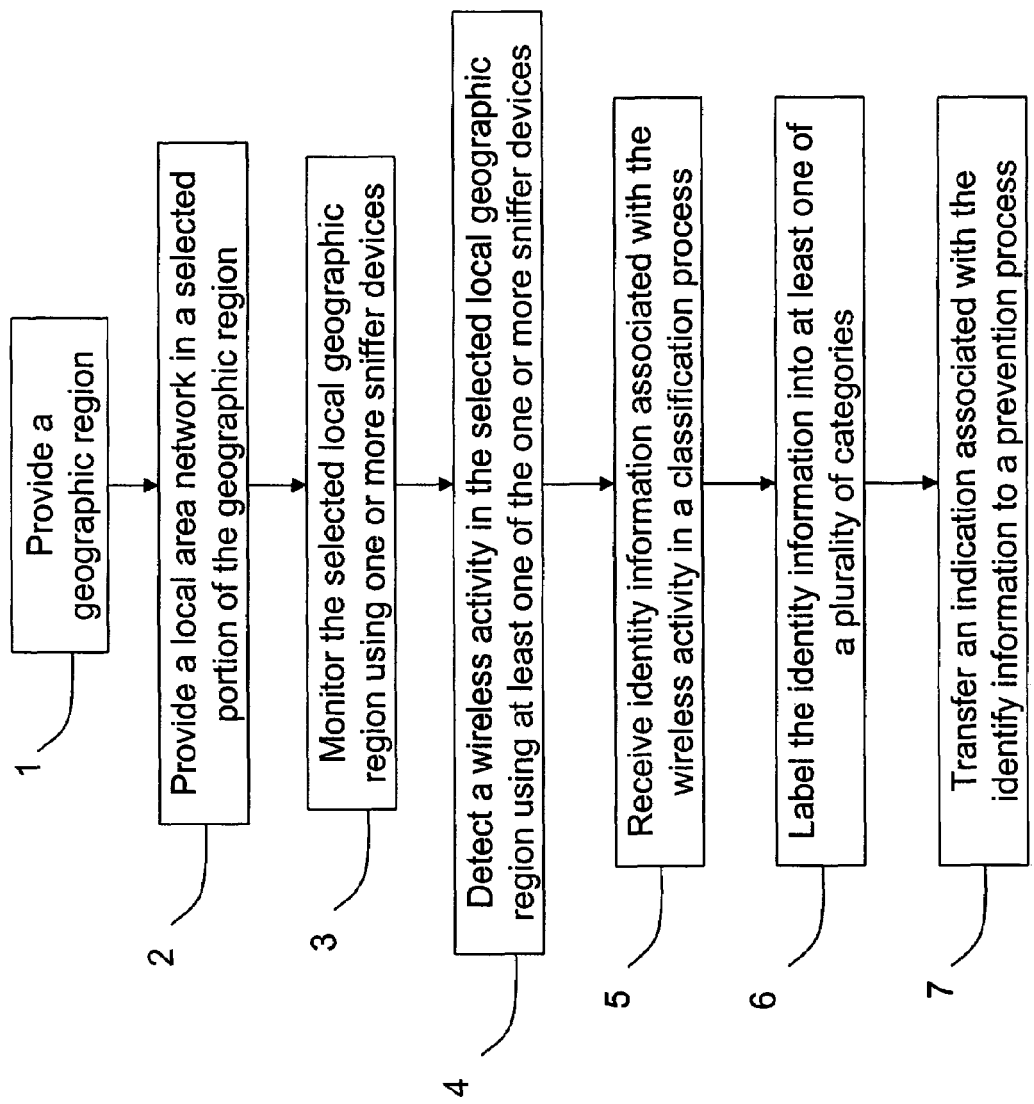
FIG. 1A illustrates a simplified flow diagram of an intrusion detection method according to an embodiment of the present invention.

FIG. 1A illustrates a simplified flow diagram of an intrusion detection method according to an embodiment of the present invention. This diagram is merely an example, which should not unduly limit the scope of the claims herein. One of ordinary skill in the art would recognize other variations, modifications, and alternatives. As shown, the present invention provides a method for monitoring a wireless communication space (e.g., office space, home, apartments, government buildings, warehouses, hot-spots, commercial facilities etc.) occupied by one or more computer networks, e.g., wired, wireless. As shown, the method includes providing a geographic region, step 1. According to a specific embodiment, the geographic region can be within a building, outside of a building, or a combination of these. As an example, the region can be provided in an office space, home, apartments, government buildings, warehouses, hot-spots, commercial facilities, etc. The method includes operating a local area network in a selected portion of the geographic region. The local area network (step 2) is commonly an Ethernet based network for private use and may be for public use or any combination of these.

In a specific embodiment, the method monitors (step 3) a selected local geographic region in the geographic region using one or more sniffer devices. The method includes detecting (step 4) a wireless activity from at least one authorized device, at least one unauthorized device, or at least one external device, within the selected local geographic region using at least one of the sniffer devices from the one or more sniffer devices. Preferably, the unauthorized device is one that is physically connected to the network but does not belong to the network. That is, the unauthorized device has intruded the network according to preferred embodiments.

The method includes receiving (step 5) at least identity information (e.g., source information, destination information, MAC address) associated with the wireless activity in a classification process. The method also includes labeling (step 6) the identity information into at least one of a plurality of categories, e.g., authorized, not authorized, external, connected, not connected, and any combination of these. Of course, one of ordinary skill in the art would recognize variations, modifications, and alternatives.

According to a specific embodiment, the method transfers (step 7) an indication associated with the identify information to a prevention process. As merely an example, once the unauthorized access point has been detected, the method sends an indication of the unauthorized access point to the prevention process. Preferably, the indication is sent almost immediately or before the transmission of one or few more packets by intruders, which is virtually instantaneously. Depending upon the embodiment, the method sends the indication via an inter process signal between various processes, which can be provided in computer codes. Alternatively, the method performs a selected function within the same process code to implement the prevention process. Certain details of the prevention process can be found throughout the present specification and more particularly below. Depending upon the embodiment, the method can perform other steps, as desired.

The above sequence of steps provides methods according to an embodiment of the present invention. As shown, the method uses a combination of steps including a way of detecting for an intrusion using wireless computer networks. In preferred embodiments, the present invention also includes an automated method for transferring an indication of an intrusion to a prevention process, which would preferably stop the intruding device before any security problems or the like. Many other methods and system are also included. Of course, other alternatives can also be provided where steps are added, one or more steps are removed, or one or more steps are provided in a different sequence without departing from the scope of the claims herein. Additionally, the various methods can be implemented using a computer code or codes in software, firmware, hardware, or any combination of these. Depending upon the embodiment, there can be other variations, modifications, and alternatives.

Figure 1B:
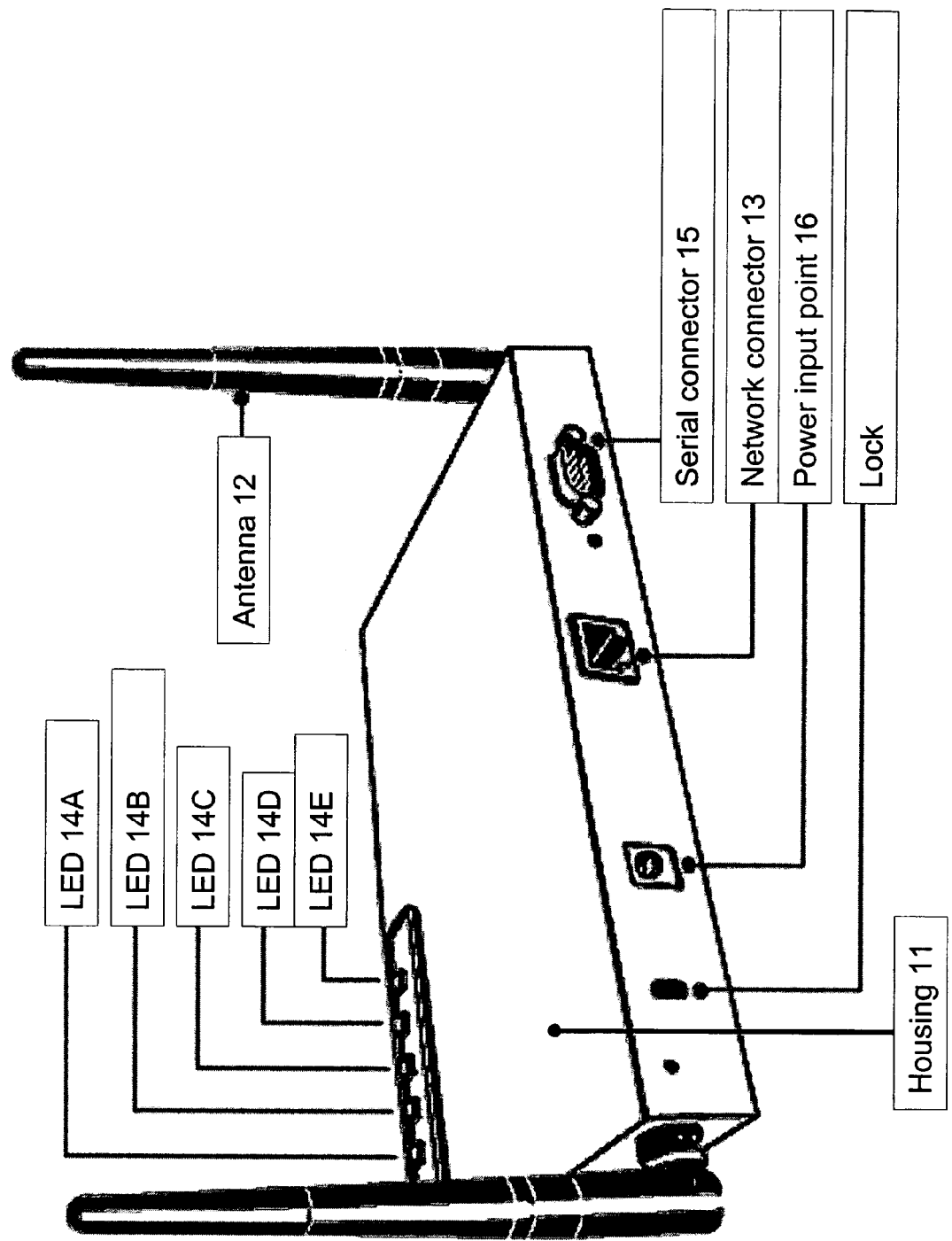
FIG. 1B is a simplified illustration of a sniffer apparatus according to an embodiment of the present invention.

FIG. 1B is a simplified illustration of a sniffer apparatus according to an embodiment of the present invention. This diagram is merely an illustration, which should not unduly limit the scope of the claims herein. One of ordinary skill in the art would recognize many variations, modifications, and alternatives. As shown, the invention provides a wireless sniffer apparatus including an automated intrusion detection process. The apparatus has housing 11, which is characterized by a length no greater than a first dimension, a width no greater than a second dimension, and a height of no greater than a third dimension. Preferably, the housing has a length no greater than a first dimension of about 40 centimeters, a width no greater than a second dimension of about 25 centimeters, and a height of no greater than a third dimension of about 10 centimeters. The housing may be made of metal or plastic, which is suitable in strength and durable. The housing encloses circuitry including chips, memory devices, wireless and wired network interface devices etc., which will be described in more detail below. In an embodiment, the wireless sniffer apparatus can be provided within an enclosure, which provides a packaging material to protect the wireless sniffer apparatus. The wireless sniffer apparatus can be removed from the enclosure for using it.

In a specific embodiment, the apparatus has a processing unit (e.g., operable at a clock speed of more than 10 MHz) within the housing and one or more wireless network interface devices (e.g., transmitter/receiver) within the housing and coupled to the processing unit. In an embodiment, the processing unit comprises one or more microprocessors. The apparatus has one or more antennas 12 coupled to the one or more wireless network interface devices. Depending upon the embodiment, the one or more antennas are adapted to protrude outside of a portion of the housing or be within the housing or any combination of these. The apparatus has at least one Ethernet network interface device (or other like device) within the housing and coupled to the processing unit and a least one network connector 13 (e.g., RJ-45 socket) coupled to the Ethernet network device. One or more memories (e.g., ROM, Flash, DRAM) are coupled to the processing unit. A code is directed to perform a process for detection of a wireless activity within a selected local geographic region. According to a specific embodiment, the wireless activity is derived from at least one authorized device or at least an other device. A code is directed to receiving at least identity information associated with the wireless activity from the detection process in a classification process. A code is directed to labeling the identity information into at least one of a plurality of categories in the classification process. The apparatus also has a code directed to testing connectivity of at least the other device associated with the detected wireless activity to a local area network within the selected local geographic region. A first output indication (e.g., light, speaker) is on the housing. The first output indication is associated with the authorized device. A second output indication (e.g., light, speaker) is on the housing. Preferably, the second output indication is associated with the other device. In a specific preferred embodiment, the visual output indications are provided using one or more of light emitting diodes or LEDs 14A–14L provided on the housing. The apparatus also has serial (e.g., RS-232) connector 15 and power input point 16. In an embodiment, an electrical connection can be plugged into the power input point 16 to provide electrical power to the wireless sniffer apparatus. Further details of the hardware and software functionality can be found throughout the present specification and more particularly below.

Figure 1C:
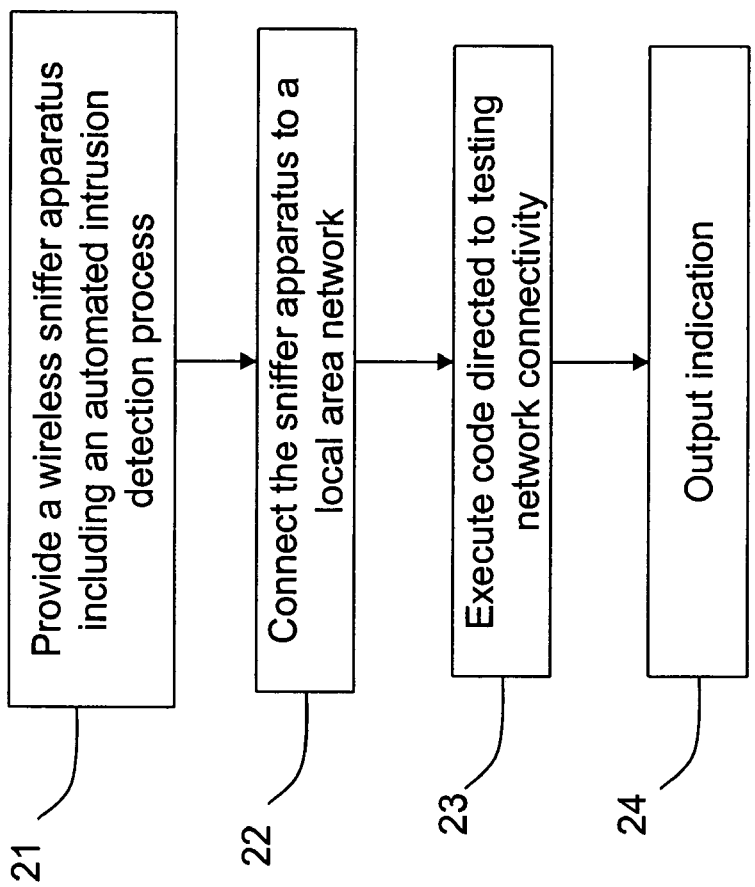
FIG. 1C is a simplified flow diagram illustrating a method for installing the sniffer apparatus according to an embodiment of the present invention.

Preferably, the sniffer device is easy to install on a given geographic region, as illustrated by the simplified diagram of FIG. 1C. Here, the method provides a method for installing one or more security devices over a selected local geographic region. As shown in step 21, the method includes providing a wireless sniffer apparatus including an automated intrusion detection process, such as those described herein. The method includes connecting the network connector of the sniffer apparatus to the local area network, step 22. The method includes executing computer codes directed to testing connectivity of at least an other device associated with the detected wireless activity to the local area network as shown in step 23 and outputting either the first output indication or the second output indication based upon the detected wireless activity as shown in step 24. Further details of various methods being carried out in the sniffer apparatus including a block diagram can be found throughout the present specification and more particularly below.

Figure 2:
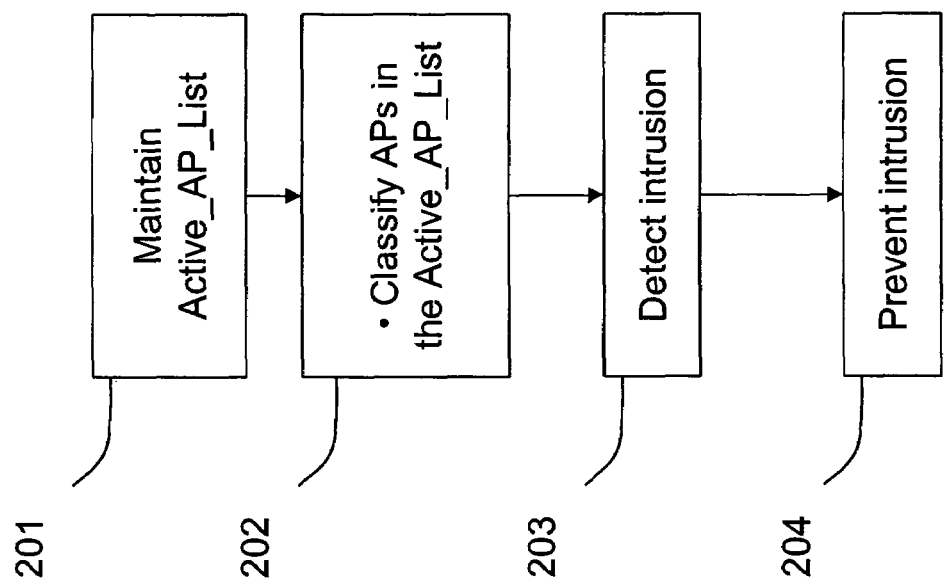
FIG. 2 shows a simplified logical flow of steps according to a method of an embodiment of the present invention.
Figure 3:
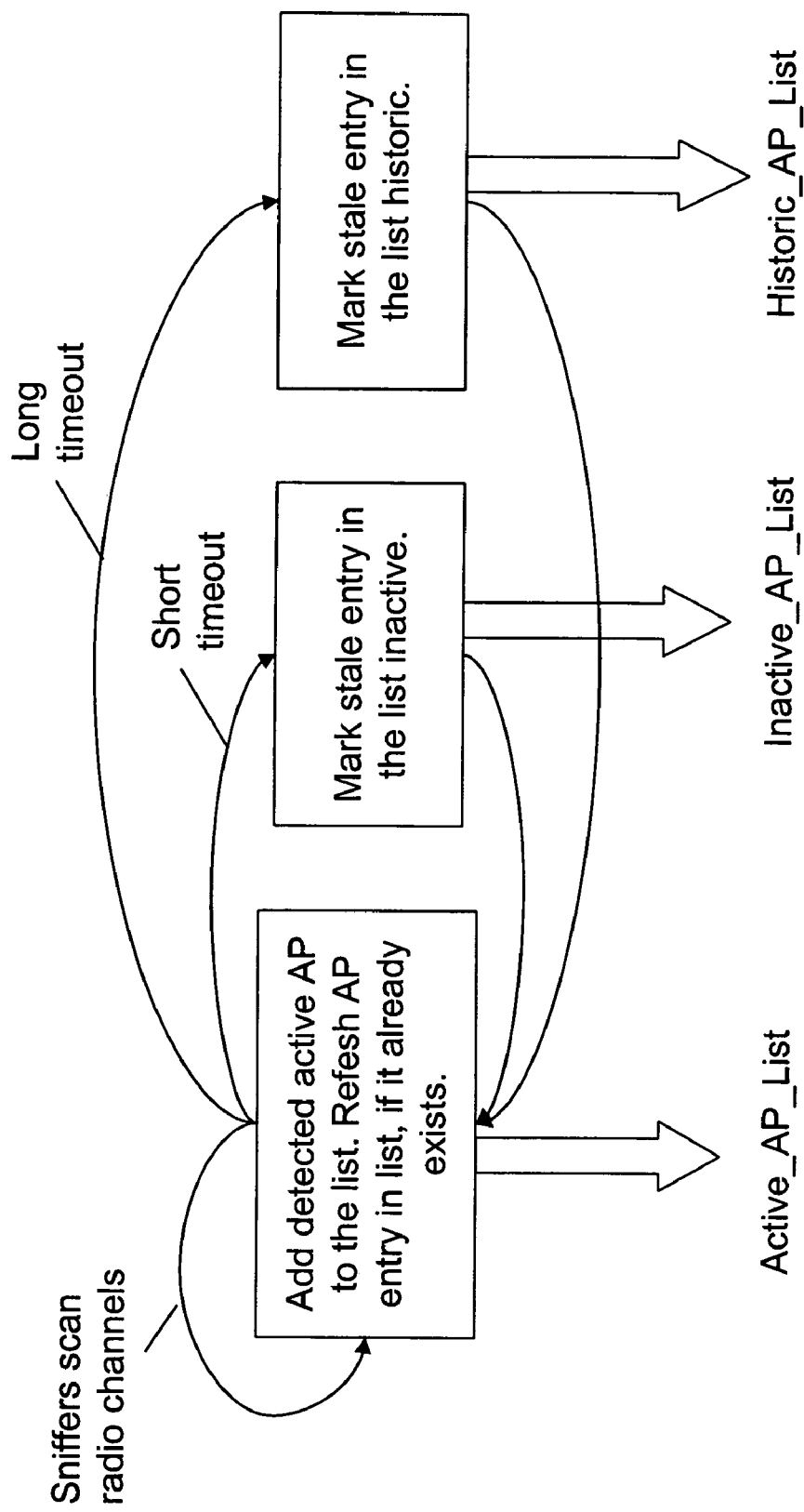
FIG. 3 shows a simplified logical flow of steps for maintaining the list of active APs according to an embodiment of the present invention.

FIG. 2 shows the logical flow of steps for wireless intrusion detection according to the method of the invention. This diagram is merely an example, which should not unduly limit the scope of the claims herein. One of ordinary skill in the art would recognize other variations, modifications, and alternatives. As shown, the first step 201 is to maintain the list of active APs called the Active_AP_List. An active AP can be an AP that was recently involved in the wireless transmission as the sender or the receiver. An active AP can be detected by analyzing the wireless transmission on the radio channel captured by the sniffer. For example, every AP in the WiFi network periodically transmits a beacon packet for the client wireless stations to be able to connect to it. The beacon packet contains information such as clock synchronization data, AP's MAC address (BSSID), supported data rates, service set identifiers (SSIDs), parameters for the contention and contention-free access to the wireless medium, capabilities as regards QoS, security policy, etc. In one embodiment, detection of beacon packet transmission from an AP is used to identify said AP to be an active AP. Beacon packet can be recognized from the type and subtype fields in the 802.11 MAC header of the beacon packet. In alternate embodiments, active AP can also be detected when any other wireless transmission (data, control or management packet) directed to or generating from it is observed by the sniffer. Whenever an active AP is detected, it is added to the Active_AP_List. If the Active_AP_List already contains entry for said AP, the corresponding entry is refreshed. Associated with each entry in the Active_AP_List are a short timeout and a long timeout values. After a short timeout, the corresponding entry is marked "inactive" and after a long timeout it is marked "historic". The logical flow of steps for maintaining the Active_AP_List is shown in FIG. 3. This diagram is merely an example, which should not unduly limit the scope of the claims herein. One of ordinary skill in the art would recognize other variations, modifications, and alternatives.

The second step 202 is to classify the APs in Active_AP_List into at least three categories, namely "authorized", "unauthorized" and "external". An authorized AP can be an AP which is allowed to be connected to the LAN by network administrator. An unauthorized AP can be an AP that is not allowed to be connected to the LAN, but is still connected to the LAN. The unauthorized APs can pose security threat to the LAN. An external AP can be an AP that can be detected in the air by sniffers but is not connected to the LAN. For example, external APs can be neighbor's APs, other extraneous APs etc. whose radio coverage spills into the region of LAN operation. In one embodiment, the external APs coexist with the LAN and may not pose a security threat. In another embodiment, the external APs are malicious APs and pose security threat to the LAN. One or more tests are performed to classify APs in the Active_AP_List into these categories.

The third step 203 is intrusion detection. When an unauthorized AP is detected, intrusion alert is generated. Whenever any wireless station attempting connection to or connected to unauthorized AP is detected, intrusion alert is generated. Once the intrusion alert is generated, the method sends an indication of the AP and/or intruding wireless station to a prevention process. Preferably, the indication is sent almost immediately or before the transmission of one or few more packets by intruders. Depending upon the embodiment, the method sends the indication via an inter process signal between various processes, which can be provided in computer codes. Alternatively, the method performs a selected function within the same process code to implement the prevention process. Further details of the prevention process can be found throughout the present specification and more particularly below.

The fourth step 204 is intrusion prevention wherein subsequent to intrusion alert; action is taken to disable or disrupt any communication between unauthorized AP and intruding wireless station. One embodiment of this step works by preventing or breaking the "association" between unauthorized AP and intruding wireless station. Association is the procedure defined in 802.11 standard wherein the wireless station and the AP establish a wireless connection between them. Techniques for preventing or breaking the association include but are not limited to sending one or more spoofed "deauthentication" packets from one or more sniffers with AP's MAC address as source address with a reason code "Authentication Expired" to a particular intruding wireless station or to a broadcast address, sending one or more spoofed De-Authentication packets from one or more sniffers to unauthorized AP with intruding wireless station's MAC address as source address with reason code "Auth Leave", sending one or more spoofed "disassociation" packets from one or more sniffers with AP's MAC address as source address to a particular intruding wireless station or to a broadcast address and sending one or more spoofed disassociation packets from one or more sniffers to unauthorized AP with intruding wireless station's MAC address as source address. Another embodiment of this step involves continuously sending frames from one or more sniffers with BSSID field containing MAC address of unauthorized AP and a high value in network allocation vector (NAV) field. All client wireless stations of said AP including said intruding wireless station then defer access to radio channel for the duration specified in NAV field. This causes disruption to the communication between said AP and said intruding wireless station. A number of other embodiments such as inflicting acknowledgement (ACK) or packet collisions via transmissions from the sniffer, destabilizing or desynchronizing the wireless stations within the BSS (basic service set) of unauthorized AP by sending confusing beacon frames from the sniffer can also be used.

Figure 4:
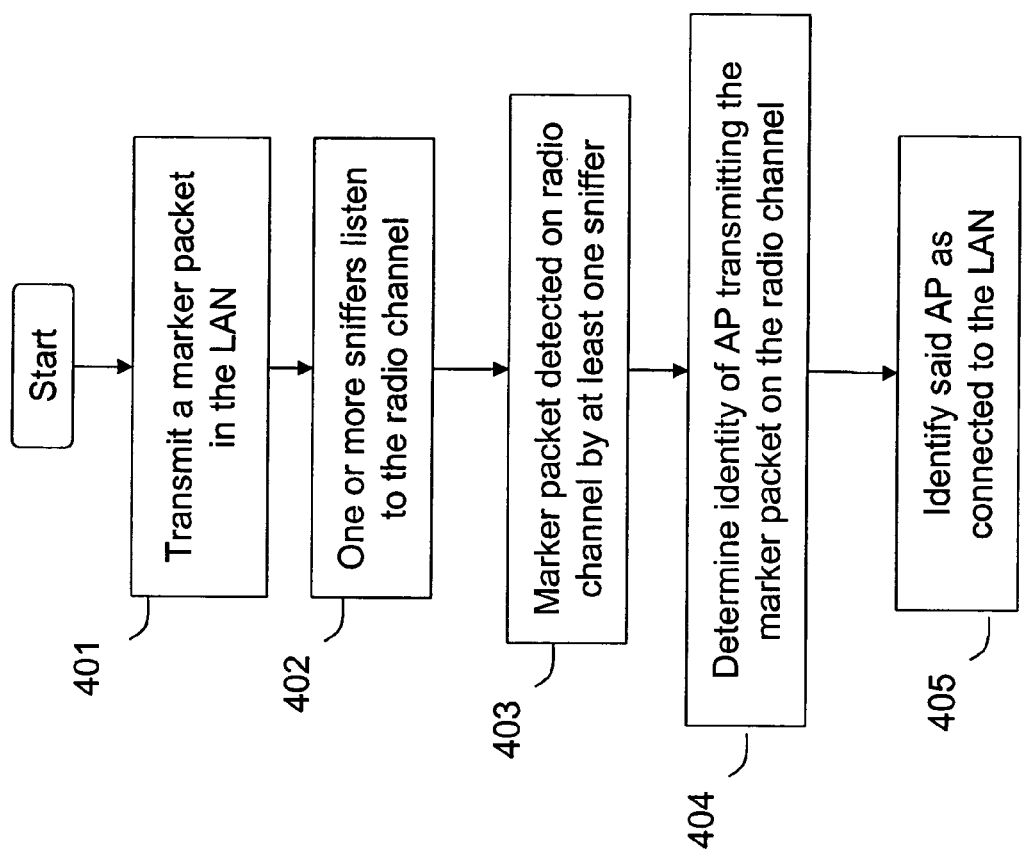
FIG. 4 shows a simplified logical flow of steps in an embodiment of the LAN connectivity test according to the present invention.

In the preferred embodiment of the method of invention, in step 202 a test called the "LAN connectivity test" is used to distinguish the APs in the Active_AP_List that are connected to the LAN (e.g., authorized or unauthorized) from those that are not connected to the LAN (e.g., external). The logical flow of steps according to an embodiment of the LAN connectivity test is shown in FIG. 4. This diagram is merely an example, which should not unduly limit the scope of the claims herein. One of ordinary skill in the art would recognize other variations, modifications, and alternatives. As shown in step 401, one or more marker packets are transmitted to the LAN by the originating device. The originating device can be a sniffer. For example, the sniffer can transmit the marker packet to the concerned LAN via the Ethernet port. The marker packet has a peculiar format using which it can later be identified by the intrusion detection system. The format can be different for different marker packets. The marker packet may contain a sequence number using which it can later be compared against the known marker packets. The marker packet may contain identity of the originating device. The marker packet is received by all or a subset of APs connected to the concerned LAN and transmitted by all or a subset of them on the wireless medium.

In step 402, one or more sniffers listen to one or more radio channels on which wireless communication can take place.

In step 403, at least one sniffer detects the transmission of at least one marker packet on the radio channel. The marker packet is detected by analyzing the format of the captured packet. If the AP transmits marker packet on the radio channel without modifying it via encryption procedure all the format information in the detected packet is available to the intrusion detection system for analysis for identifying marker packet. If the AP transmits marker packet on the radio channel after modifying it via encryption procedure the intrusion detection system may not be able to analyze all the format information in the detected packet. In this case, certain features of the packet format that are unaffected by encryption procedure are used for analysis. For example, the encryption procedure does not change the size of the data being encrypted. Thus the size of detected packets can be used as a format parameter to identify said packet as the marker packet.

Then in step 404 the identity of the AP that transmits the marker packet is determined from the 802.11 MAC header (for example from the transmitter address or BSSID fields) of the packet transmitted on the radio channel.

In step 405, the AP that transmits the marker packet is declared to be connected to the LAN. In a preferred embodiment, the corresponding entry in the Active_AP_List is marked as "connected to the LAN".

In one embodiment of the above method, the marker packet is an Ethernet style packet addressed to the broadcast address, i.e., the value of hexadecimal ff:ff:ff:ff:ff:ff in the destination address field of Ethernet MAC header. This packet will be received by all APs that are present in the LAN broadcast domain. The APs among these acting as layer 2 bridges then transmit this broadcast packet on the wireless medium after translating it to the 802.11 style packet.

In alternate embodiment, the marker packet is an Ethernet style unicast packet addressed to the MAC address of a wireless station associated with an AP. Said MAC address is inferred by analyzing the prior communication between said wireless station and said AP captured by the sniffer. This packet will be received by said AP if it is connected to the concerned LAN. Said AP acting as layer 2 bridge then transmits the marker packet on the wireless medium after translating it to the 802.11 style packet.

In another alternate embodiment, the marker packet is an IP packet addressed to the IP address of a wireless station associated with an AP. Said AP address is inferred by analyzing the prior communication between said wireless station and said AP that is captured by the sniffer. This packet will be received by said AP if it is connected to the concerned LAN and transmitted by said AP on the wireless medium after translating it to the 802.11 style packet.

In yet an alternate embodiment, the marker packet is an IP packet addressed to the broadcast IP address of the LAN.

In one embodiment, the marker packet is not actively injected in the LAN by the intrusion detection system. Rather, one or more broadcast/multicast/unicast packets from the data traffic on the LAN are used as marker packets. The logic being if an AP is connected to the same LAN as the sniffer, then at least the subset of the data traffic seen by the Ethernet port of the sniffer will be same as the data traffic captured by the sniffer on the radio channel. Thus the sniffer compares the packet captured on the radio channel with the packets transmitted over the wired LAN and captured by the sniffer's LAN connection port (Ethernet NIC) to identify a matching format.

The sniffer can detect the appearance of the marker packet on a specific radio channel only if the sniffer is tuned to said radio channel during the interval of transmission of the marker packet on said radio channel. It may thus be necessary to send marker packets in the LAN periodically and preferably at randomized intervals, so as to maximize the probability that at least one sniffer gets an opportunity to detect at least one marker packet transmitted by each AP connected to the LAN. In a preferred embodiment, a sniffer originates a marker packet and the same sniffer monitors wireless medium to detect the transmission of the marker packet on the wireless medium from one or more APs.

Figure 5:
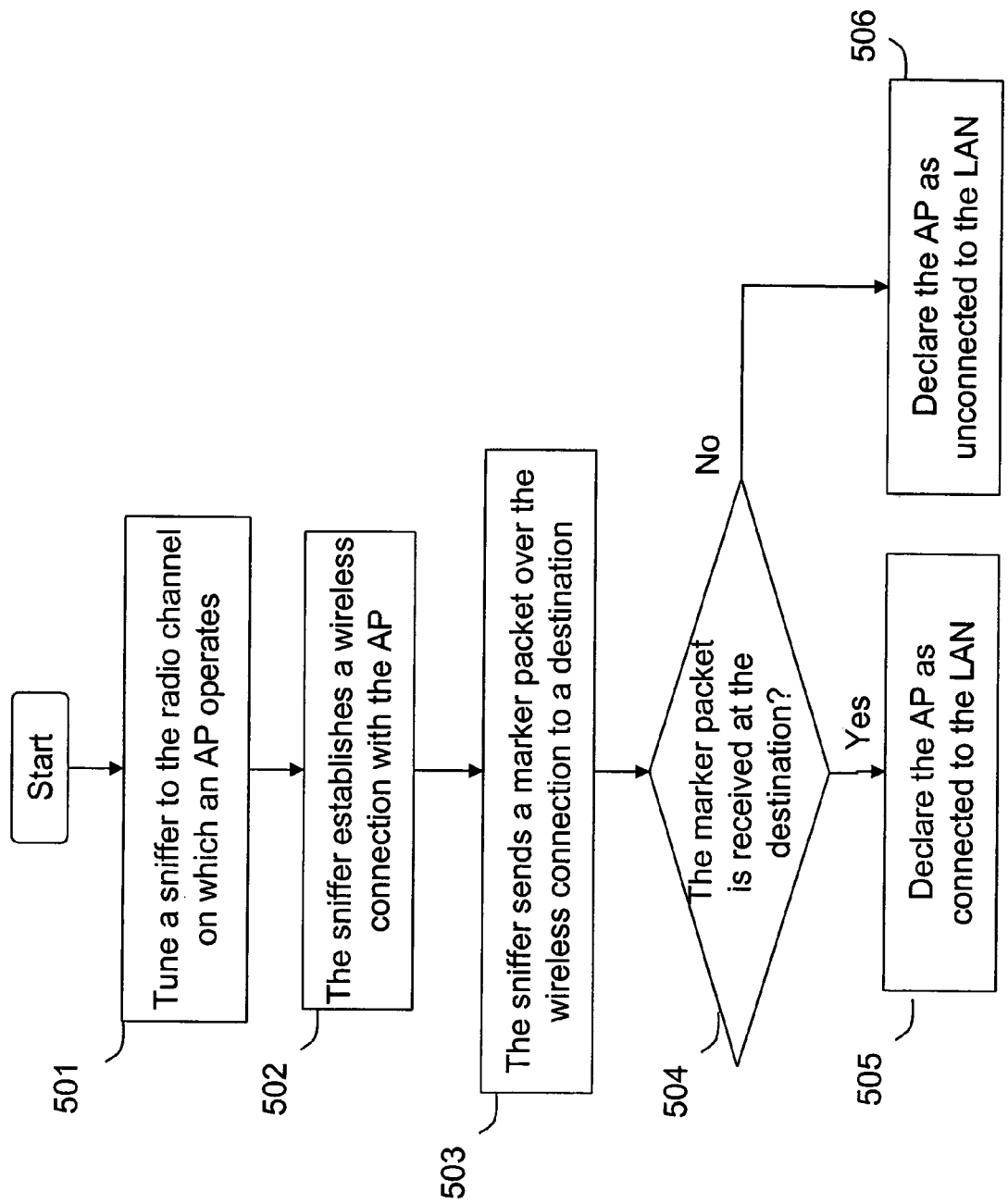
FIG. 5 shows a simplified logical flow of steps in another embodiment of the LAN connectivity test according to the present invention.

The logical flow of steps according to another embodiment of the LAN connectivity test is shown in FIG. 5. This diagram is merely an example, which should not unduly limit the scope of the claims herein. One of ordinary skill in the art would recognize other variations, modifications, and alternatives. This embodiment is particularly useful to detect unauthorized APs that implement NAT (i.e., network address translation) functionality unlike layer 2 bridge functionality though it is also useful for the latter. The test is also useful to detect unauthorized layer 2 bridge type APs (e.g., soft APs) that block forwarding of broadcast packets from the wired LAN onto the wireless medium so as to evade detection by previous embodiment of the LAN connectivity test.

In step 501, the sniffer is tuned to the radio channel on which an AP operates. In step 502, the sniffer establishes wireless connection with said AP. This typically involves listening to AP's beacon packet and subsequently performing "association" procedure with said AP as described in IEEE 802.11 standard. Subsequent to association, the parameters for IP connection are assigned to the radio interface of the sniffer. A preferred method to assign IP connection parameters is for the sniffer to perform DHCP (i.e., dynamic host configuration protocol) request/response transactions over the wireless connection established with AP. These parameters comprise at least of the IP address for the radio interface of the sniffer. The DHCP is described in RFC 2131 standard of the Internet Engineering Task Force (IETF).

In an alternate embodiment, in step 502 rather than establishing a new association with the AP, the sniffer reuses an existing association between the AP and a wireless station associated with the AP. For this, the sniffer detects the parameters of an existing association between the AP and the wireless station associated with the AP. The parameters include, among others, the MAC address of the associated wireless station. The sniffer may also determine the IP address and the TCP or UDP port number of the wireless station by monitoring the packets transmitted or received by the station.

In step 503, the sniffer sends one or more marker packets to the AP over the wireless connection newly established or already existing as applicable depending on the embodiment of step 502. Preferably, the marker packet is addressed to the sniffer itself. Various preferred embodiments for this step are now described.

In one embodiment of step 503, the marker packet is UDP (i.e., user datagram protocol) packet. UDP is the transport layer protocol used by computers in the IP network to exchange data. It is described in RFC 768 standard of the IETF. In a preferred embodiment, UDP marker packet has source IP address as the IP address of the radio interface of the sniffer. In an alternative embodiment wherein step 502 reuses existing association, preferably the UDP marker packet has the source IP address and the source UDP port number same as the corresponding values detected in the packets transmitted by the wireless station whose association is being reused by the sniffer. The destination IP address in the UDP packet is the IP address of the wired (Ethernet) interface of the sniffer.

In another embodiment of step 503, the marker packet is a TCP (i.e., transmission control protocol) packet. The TCP is a transport protocol described in RFC 793 standard of the IETF. It is used by computers in IP network for reliable exchange of data. In a preferred embodiment, TCP marker packet is TCP SYN packet. In alternate embodiment, it can be any packet in TCP format. In a preferred embodiment, TCP marker packet has source IP address as the IP address of the radio interface of the sniffer. In an alternative embodiment wherein step 502 reuses existing association, preferably the TCP marker packet has the source IP address and the source TCP port number same as the corresponding values detected in the packets transmitted by the wireless station whose association is being reused by the sniffer. The destination IP address in the TCP packet is the IP address of the wired (e.g., Ethernet) interface of the sniffer.

In yet another embodiment of step 503, the marker packet is any layer 2 style frame. In a preferred embodiment, the source address in said layer 2 frame is the MAC address of the radio interface of the sniffer. In an alternative embodiment wherein step 502 reuses existing association, preferably the source address in the layer 2 frame is the MAC address of the wireless station whose association is being reused by the sniffer. The destination address in the layer 2 frame is the MAC address of the wired (e.g., Ethernet) interface of the sniffer.

In yet another embodiment of step 503, the marker packet is addressed to the broadcast address. If the sniffer detects that the IP address assigned to its radio interface is in the domain of addresses assigned to the wired LAN, the marker packet can be addressed to IP broadcast address in said domain of addresses. The IP broadcast address is constructed by using all binary ones in the host address part and using the network number of said wired LAN in the network address part of the IP address. Alternatively, layer 2 format marker packet can be addressed to the MAC broadcast address, which is hexadecimal ff:ff:ff:ff:ff:ff.

If said AP is indeed connected to the LAN, it will forward marker packet from the wireless connection to the LAN and thus the marker packet will be received at the sniffer in step 504.

Subsequently, said AP is declared to be connected to the LAN in step 505. Alternatively, if the AP is not connected to the LAN, the marker packet will not be received at the sniffer and said AP is then declared unconnected to the LAN in step 506 according to a specific embodiment.

Figure 6:
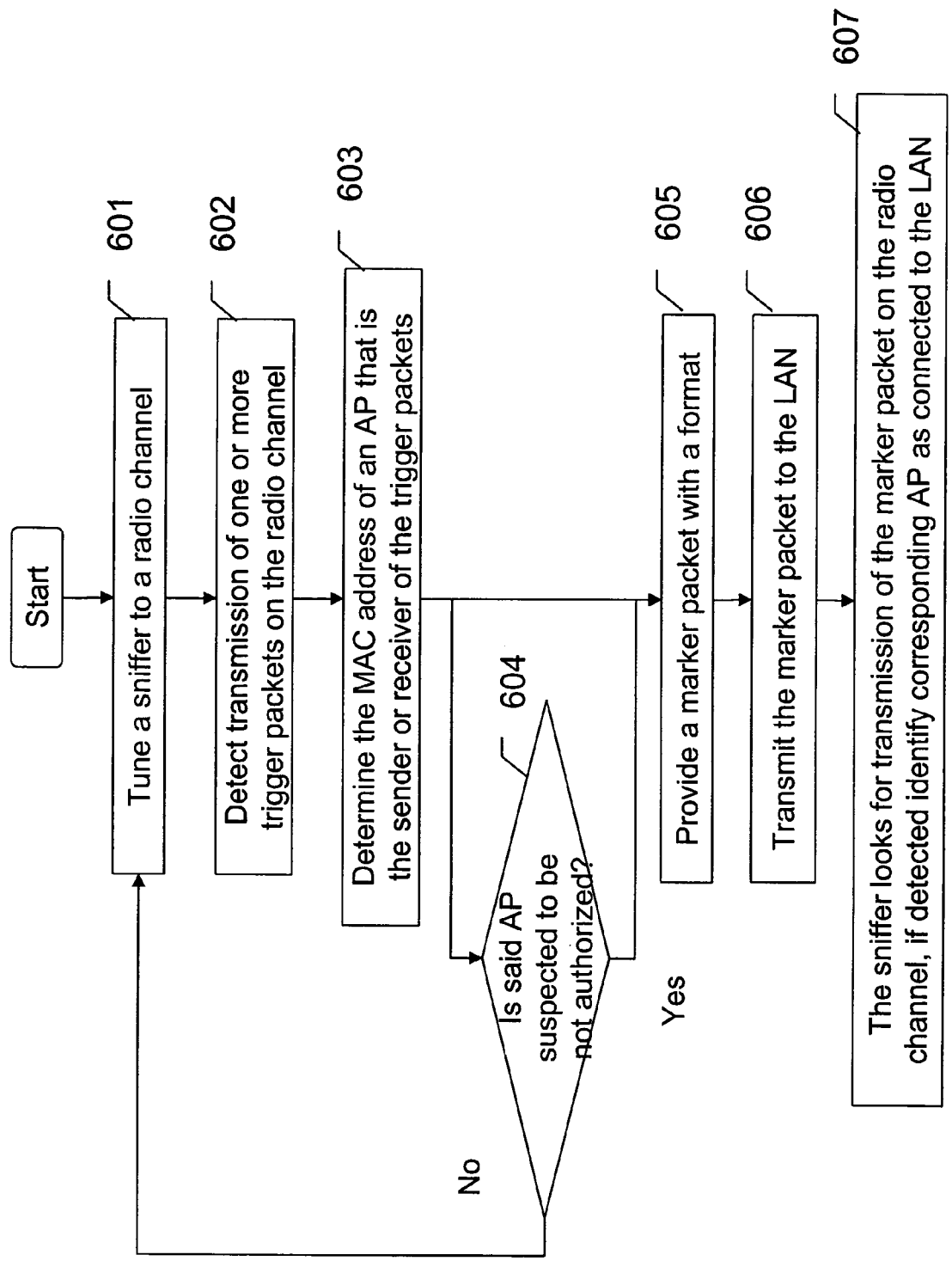
FIG. 6 shows a simplified logical flow of steps in another embodiment of the LAN connectivity test according to the present invention.

The logical flow of steps according to another embodiment of the LAN connectivity test is shown in FIG. 6. This diagram is merely an example, which should not unduly limit the scope of the claims herein. One of ordinary skill in the art would recognize other variations, modifications, and alternatives.

For this, in step 601 the sniffer is tuned to a radio channel. The sniffer listens to the radio channel to detect the transmission of one or more "trigger" packets. In a specific embodiment, the trigger packets indicate the current state of ongoing communication between an AP and a wireless station. Knowing this enables preparing and sending marker packet so that it is almost indistinguishable from the packets constituting the ongoing communication between the AP and the wireless station. This makes it difficult for certain APs, for example compromised, software controlled or non-standard, to evade detection by marker packet test.

When the transmission of one or more trigger packets is detected in step 602, the identity of the AP that is the source or destination of the trigger packets is determined in step 603 from the transmitter address or the receiver address in the 802.11 MAC header of the trigger packets.

Depending upon the type of trigger packets an optional step 604 is performed to determine if said AP is suspected to be not authorized (i.e. it can be unauthorized or external). For example an AP in the Active_AP_List that has not previously responded to any LAN connectivity test is suspected to be not authorized. Or, an AP whose behavior (contents of beacon frame, MAC address, authentication and encryption methods etc.) does not match the behavior known of the authorized APs is suspected to be not authorized.

In step 605 one or more marker packets are constructed based on the type of trigger packets and information contained therein. The marker packets are transmitted in the LAN in step 606. The sniffer continues to listen to the same radio channel to detect the transmission of at least one marker packet on the radio channel by said AP. If the marker packet transmission is detected before a timeout occurs, said AP is declared to be connected to the LAN. Alternatively, the AP is declared unconnected to the LAN according to a specific embodiment.

In one embodiment of the LAN connectivity test using trigger packets, the trigger packets and the marker packets are transmission TCP packets. TCP is used by computers in Internet Protocol (IP) network for reliable exchange of data. TCP provides acknowledgement-based data delivery wherein lost pieces of data are recovered via retransmissions. The TCP also uses window-based congestion control algorithm so as to dynamically adapt to the available bandwidth between the communicating computers. A number of desirable Internet applications such as HTTP, file transfer, email, remote login, etc., are performed using TCP as transport protocol.

Suppose the sniffer detects transmission of a TCP packet from a wireless station to the AP (called uplink direction) that is suspected to be not authorized. TCP packet is identified by examining the header fields of detected packet transmission. Specifically, for the TCP packet the value of "Type" field in 802.2 frame header is hexadecimal 0800 and the value of "Protocol" field in the IP header is hexadecimal 06. Then the marker packet is constructed as a TCP packet and in one embodiment the various fields in the marker packet (step 605 above) are set as follows:

Swap the source and destination addresses in the Ethernet, IP and TCP headers of trigger packet to get source and destination addresses in the corresponding headers of marker packet.

Set the TCP payload in marker packet such that it can later be identified by the intrusion detection. Let L denote the size of payload in number of octets.

Let $x1$ denote the value of "sequence number" field in the TCP header of trigger packet and $x2$ denote the number of octets of TCP payload in the trigger packet. Then set "acknowledgement number" field in the TCP header of marker packet equal to $(x1+x2)$.

Let $x3$ denote the value of "acknowledgement number" field and $x4$ denote the value of "window" field in the TCP header of trigger packet. Then set the value of "sequence number" field in the TCP header of marker packet to a value that is between $(x3-1)$ and $(x3+x4-L)$.

Other fields in the marker packet are set according to standard practice used by various implementations of corresponding protocols. Among these, values for some of the fields can be more judiciously chosen if the sniffer has also recently captured a TCP packet of the same flow transmitted by said AP to said wireless station (downlink). For example, the value of "window" field in the marker packet can be set equal to or close to the value of "window" field in the recently captured downlink TCP packet. Similarly, the value of "Identification" field in the IP header of marker packet can be set greater than the value of "Identification" field in the recently captured downlink TCP packet.

Suppose that the sniffer detects downlink TCP packet. Then the marker packet is constructed as a TCP packet and in one embodiment the various fields in the marker packet (step 605 above) are set as follows:

a. Swap source and destination addresses in the Ethernet, IP and TCP headers of trigger packet to get source and destination addresses in the corresponding headers of marker packet.

b. Set the TCP payload in marker packet such that it can later be identified by the intrusion detection. Let L denote the size of payload in number of octets.

c. Let $x1$ denote the value of "sequence number" field in the TCP header of trigger packet and $x2$ denote the number of octets of TCP payload in the trigger packet. Then set sequence number field in the TCP header of marker packet to a value greater than $(x1+x2-1)$. If the sniffer has recently captured uplink TCP packet of the same flow and thus the intrusion detection has the knowledge of value of "window" field in recent uplink packet, the value of "sequence number" field in marker packet should be chosen so that it is also less than $(x1+window-L+1)$.

d. Other fields in the marker packet are set according to standard practice used by various implementations of corresponding protocols. Among these, values for some of the fields such as "window" field in TCP header and "Identification field in IP header can be more judiciously chosen if the sniffer has also recently captured uplink TCP packet of the same flow.

In another embodiment of the LAN connectivity test using trigger packets, the trigger packet is DHCP request packet and the marker packet is DHCP response packet.

In the preferred embodiment of the method of invention, in step 202 one or more feature criteria are used distinguish the APs in the Active_AP_List that are authorized by the network administrator from those that are not authorized. The latter include unauthorized and external APs. The method of invention works by inferring one or more features of an AP via analysis of the packets captured by the sniffer and comparing them with the features of the authorized APs. If the discrepancy is detected, said AP is deemed to be not authorized.

A number of features of an AP can be inferred by analyzing one or more beacon packets transmitted by the AP. These features include but not limited to the vendor information (indicated by the first three bytes of the MAC address of the AP), the observed beacon interval and values of various fields (according to basic 802.11 and its enhancements including 802.11e, 802.11i, 802.11k and others) in the beacon packet such as beacon interval, SSID, capabilities information, radio parameters, various information elements (IEs) etc.

Some other features of an AP can be inferred by analyzing the sequence of packets flowing between the AP and a wireless station. Most notably, the flow of authentication and association procedure (WEP, WPA, TKIP, RSN etc.) can be monitored by the sniffer to determine if it is consistent with that of an authorized AP.

The feature set of authorized APs can be provided to the intrusion detection system by the network administrator. Alternatively, the intrusion detection system can learn the authorized feature set by detecting APs and their associated feature set in the operational network or laboratory environment. In the former case, the network administrator merely indicates to the intrusion detection system as to which of the detected APs are authorized APs.

The sniffer may perform active probing to infer the features of an AP. For example, the sniffer attempts to establish a wireless connection with the AP which typically involves authentication and association procedure. The sniffer is provided with the credentials to be used during the authentication procedure. For example, the credentials include but not limited to password, digital certificate, security key, etc. If the sniffer succeeds in establishing the wireless connection with the AP, the AP may be declared as authorized. This test is even more effective for the authentication schemes, such as extensible authentication protocol transport layer security (EAP TLS), which perform mutual authentication. Depending upon the embodiment, the present invention can implement the various methods using certain systems, which are described in more detail below.

Figure 7:
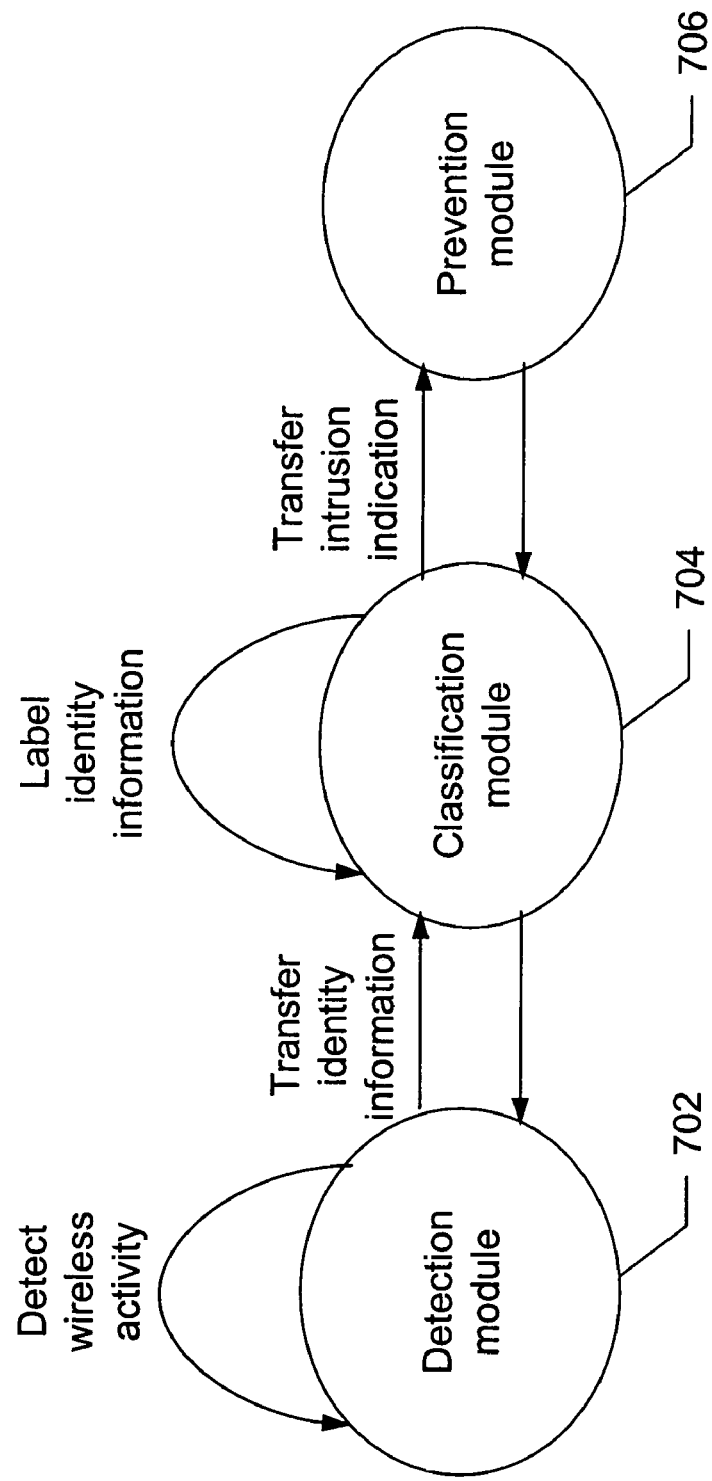
FIG. 7 is a simplified system diagram according to an embodiment of the present invention.

One embodiment of the intrusion detection system according to present invention is described with reference to FIG. 7. The system comprises a detection module 702, a classification module 704 and a prevention module 706, each of the modules comprising one or more computer executable codes. The various codes can be running in one or more computer processes.

The detection module 702 is directed to performing tasks associated with detecting wireless activity. In a specific embodiment the detecting comprises capturing, decoding and processing the wireless activity. The detecting may further comprise filtering and summarizing the information associated with or derived from the wireless activity. The detection module is further directed to transferring at least identity information associated with the detected wireless activity to the classification module. In a specific embodiment the detection module transfers additional information associated with the detected activity such as information derived from beacon packet, marker packet, authentication packet and other packets to the classification module. The classification module 704 is directed to performing tasks associated with receiving and labeling the identity information associated with the wireless activity into at least one of a plurality of categories. In a specific embodiment, the classification module analyzes the additional information associated with the wireless activity received from the detection module for the sake of labeling the identity information. The classification module is further directed to performing tasks associated with transferring indication associated with the identity information to the prevention module 706. In one specific embodiment, the indication is an intrusion alert. In a specific embodiment, intrusion alert is generated when an unauthorized AP and/or intruding wireless station is detected by the classification process.

Figure 8:
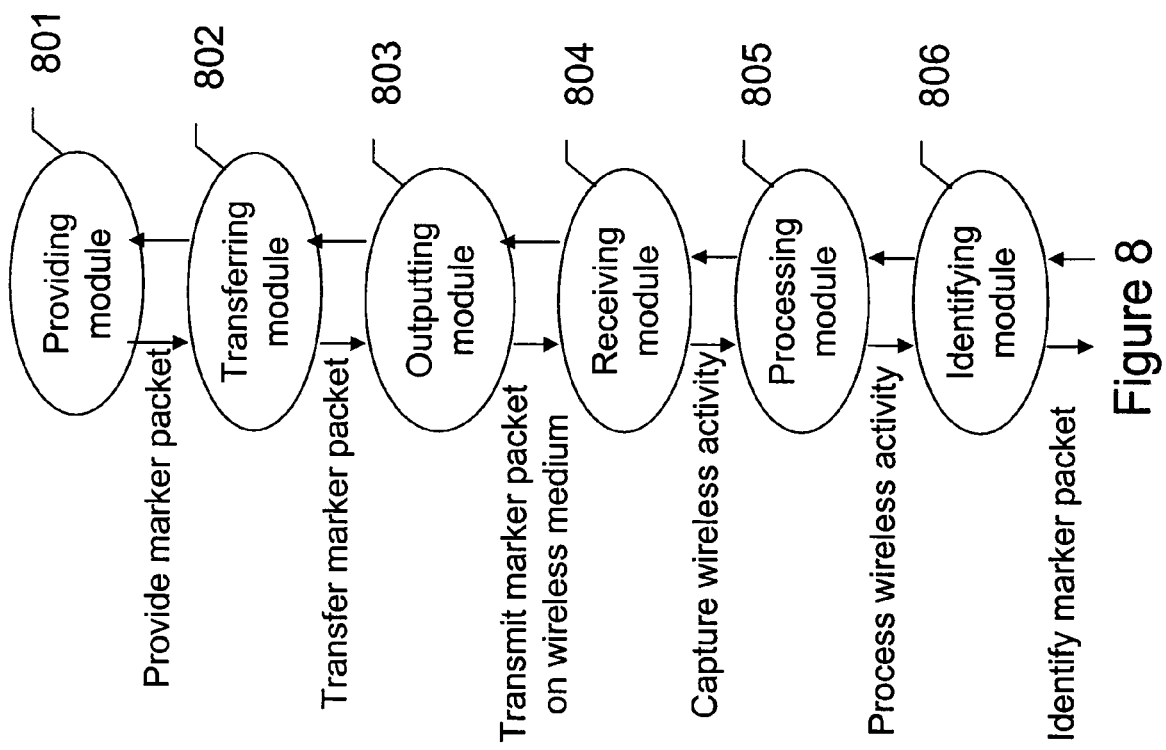
FIG. 8 is a simplified system diagram according to an alternative embodiment of the present invention.

Another embodiment of the intrusion prevention system according to present invention is described with reference to FIG. 8. The system comprises a providing module 801, a transferring module 802, an outputting module 803, a receiving module 804, a processing module 805 and an identifying module 806. Each of the modules comprises one or more computer executable codes. The providing module 801 prepares the marker packet with a given format. In a specific embodiment, the providing module resides within the originating device (e.g., sniffer). The transferring module 802 transmits the marker packet to one or more APs over the LAN. In a specific embodiment the transferring module resides within the originating device (e.g., sniffer). The outputting module 803 transmits the marker packet from the AP to the wireless medium. In a specific embodiment, the outputting module resides within the AP. The receiving module 804 is directed to receiving wireless activity associated with the marker packet using at least one sniffer. The processing module 805 is directed to processing the wireless activity information to identify the marker packet. In a specific embodiment, the processing module analyzes the format information in the received wireless activity to identify the marker packet. The identifying module 806 is directed to determining the identity information associated with the wireless activity associated with the marker packet. In a specific embodiment, the identifying module determines the source AP of the wireless activity associated with the marker packet. In another specific embodiment, the receiving module, the processing module and the identifying module are provided within the sniffer device.

Figure 9:
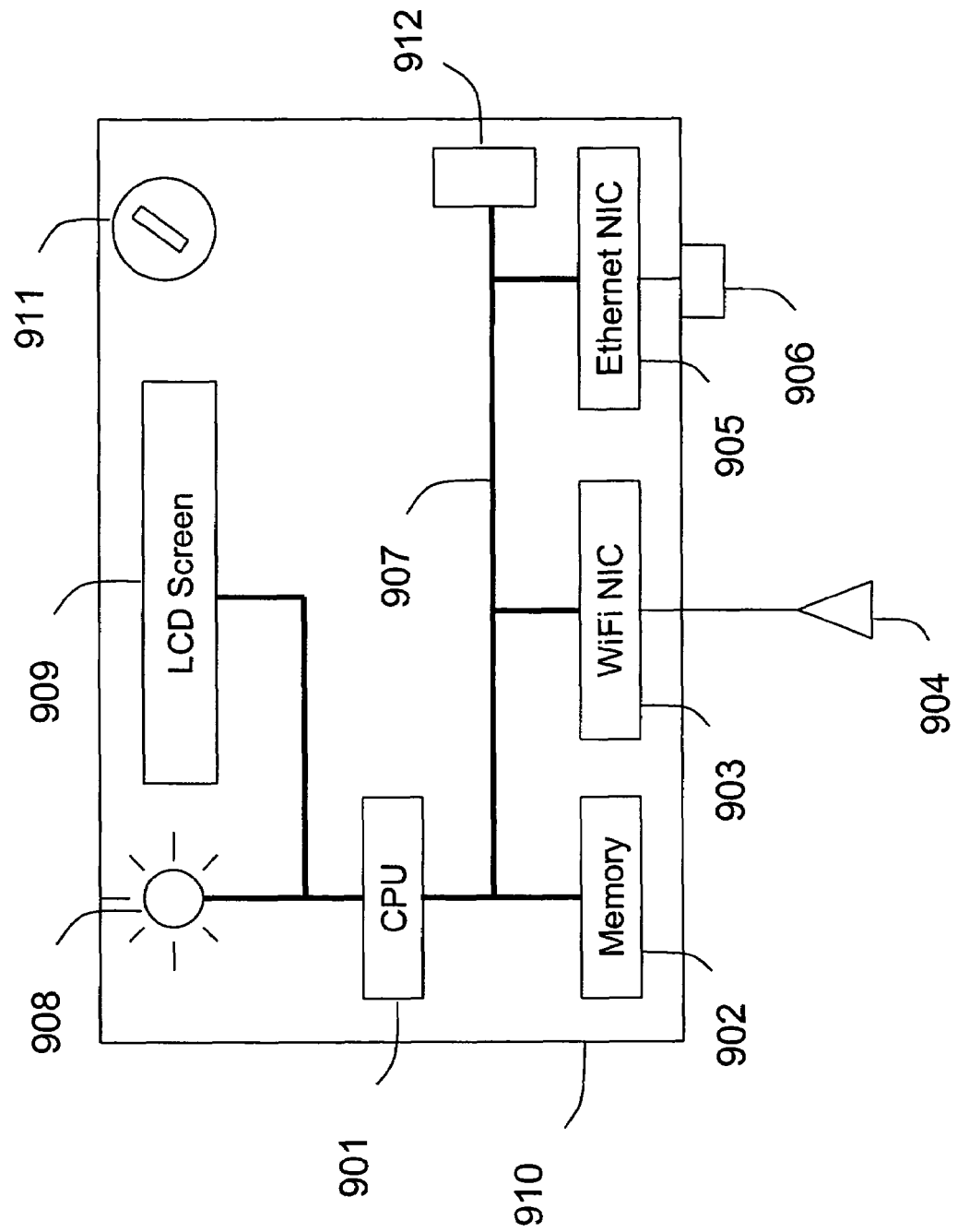
FIG. 9 is a simplified system diagram of a standalone implementation according to an embodiment of the present invention.

Another alternative embodiment of the intrusion detection system is described below with reference to FIG. 9. In this embodiment, the detection, classification and prevention modules are provided within the sniffer device. The sniffer also provides and transfers a maker packet. The sniffer further receives the wireless activity associated with the marker packet, processes said activity to identify the marker packet and identifies the AP that transmits marker packet on the wireless medium. This embodiment in particularly advantageous because it allows deployment of standalone sniffer devices (e.g., as appliances).

Accordingly, the sniffer appliance device comprises a CPU 901 adapted to executing computer codes and a memory 902 that stores computer codes and data. The computer codes stored in the memory comprise at least the codes for detection, classification and prevention modules and the codes adapted to perform communication between said modules. The computer codes stored in the memory further comprise the codes for providing a marker packet, transferring a marker packet, receiving a wireless activity associated with the marker packet, processing said wireless activity to identify the marker packet and identifying the AP that transmits the marker packet on the wireless medium. The sniffer appliance device comprises one or more WiFi NICs 903 connected to one or more antennas 904. The WiFi NICs performs the tasks associated with receiving the wireless activity (e.g., listening to and capturing the packet transmissions occurring over the wireless medium in accordance with 802.11 standard) as well as initiating the wireless activity (e.g., transmitting packets in accordance with 802.11 standard). The Ethernet NIC 905 is also provided that enables connecting the sniffer appliance device to the LAN via Ethernet jack 06 (e.g., RJ-45 socket). The Ethernet jack 906 may alternatively and additionally be used to connect the sniffer appliance to a PC for configuration purposes. Alternatively, a serial communication interface (e.g., RS-232) 912 is used to connect the sniffer appliance to a PC for configuration purposes. The various electronic components are connected together using data transfer bus 907. The sniffer device can provide visual indication about detected wireless activity by means of one or more light bulbs or light emitting diodes 908 provided on the device panel 910. Optionally or in addition to, an electronic screen such as for example LCD screen 909 is provided on the device panel for providing visual indication and/or textual messages. In a specific preferred embodiment, the indication is associated with a device type selected from, but not limited to, a no active device type, at least one active device type, all authorized device type, at least one unauthorized device type, and at least one unauthorized device in active communication type.

After the sniffer device is powered on, the light bulb 908 turns white in color if Active_AP_List is empty. The bulb turns yellow when at least one active AP is detected. After the sensor device is connected to the wired LAN (e.g., using Ethernet jack 906), it can start executing steps 202 and beyond shown in FIG. 2 according to the specific embodiment of the method of invention. If only authorized APs connected to the LAN are detected, the bulb turns green. If the unauthorized AP is detected in step 202, the light bulb turns red in color. If the wireless station attempting to connect or connected to the unauthorized AP is detected in step 203, the light bulb turns flashing red. Alternatively, the various visual indications are provided via combination of light bulbs from a plurality of light bulbs provided on the device panel (e.g., one for each event). Other indications may also be provided via one or more light bulbs. Yet alternately, such indications can also be given in audio form, for example via different types of alarm sounds from the speaker (not shown in FIG. 9). An on/off switch 911 may be provided on the sniffer device panel that enables turning the intrusion defense step 204 on or off. Alternatively, the on/off switch for activating and deactivating the intrusion defense is software controlled. Yet alternatively, the step 204 is executed automatically after intrusion detection.

Figure 10A:
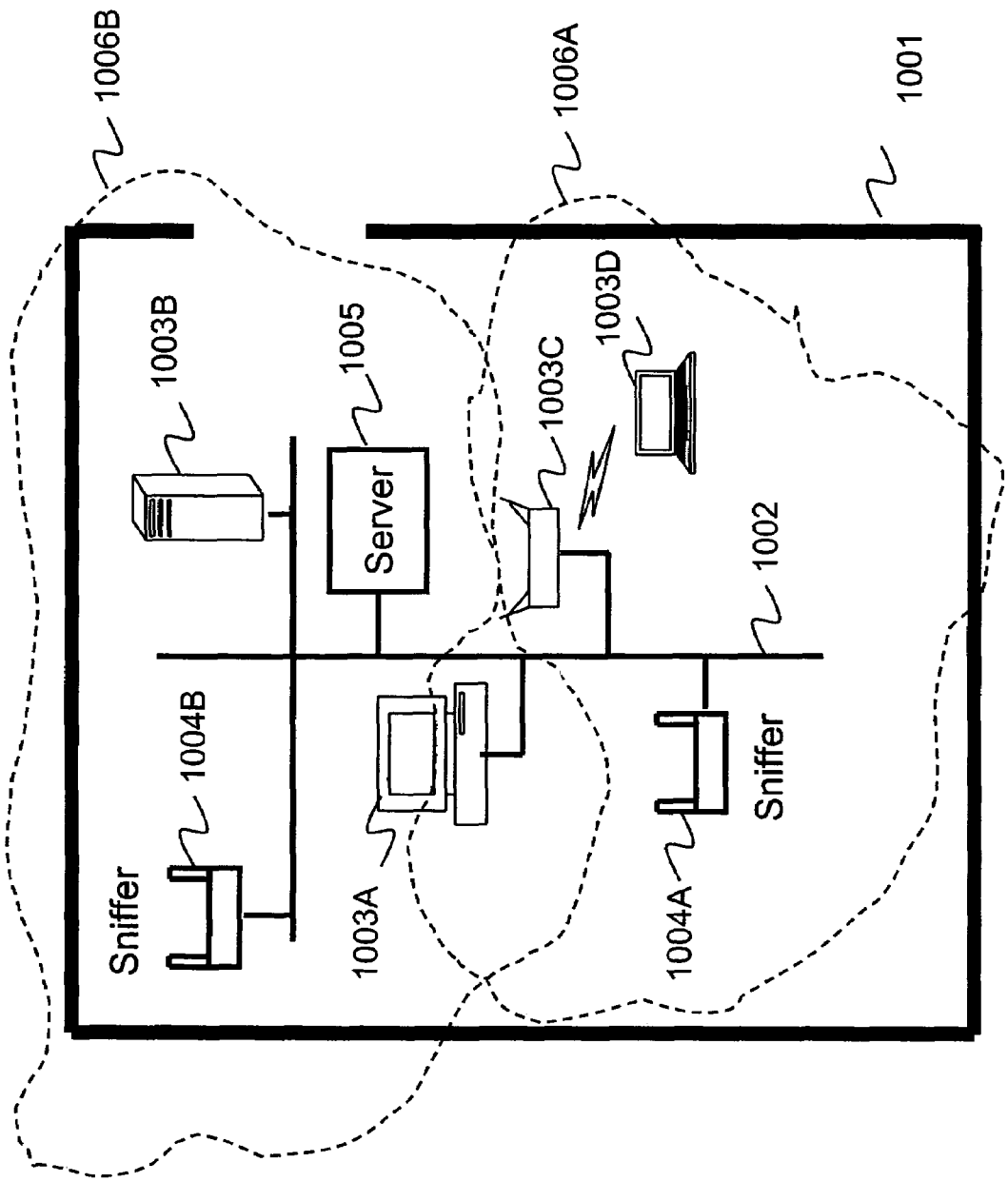
FIG. 10A shows a simplified system diagram of certain conventional intrusion detection system including client-server architecture.
Figure 10B:
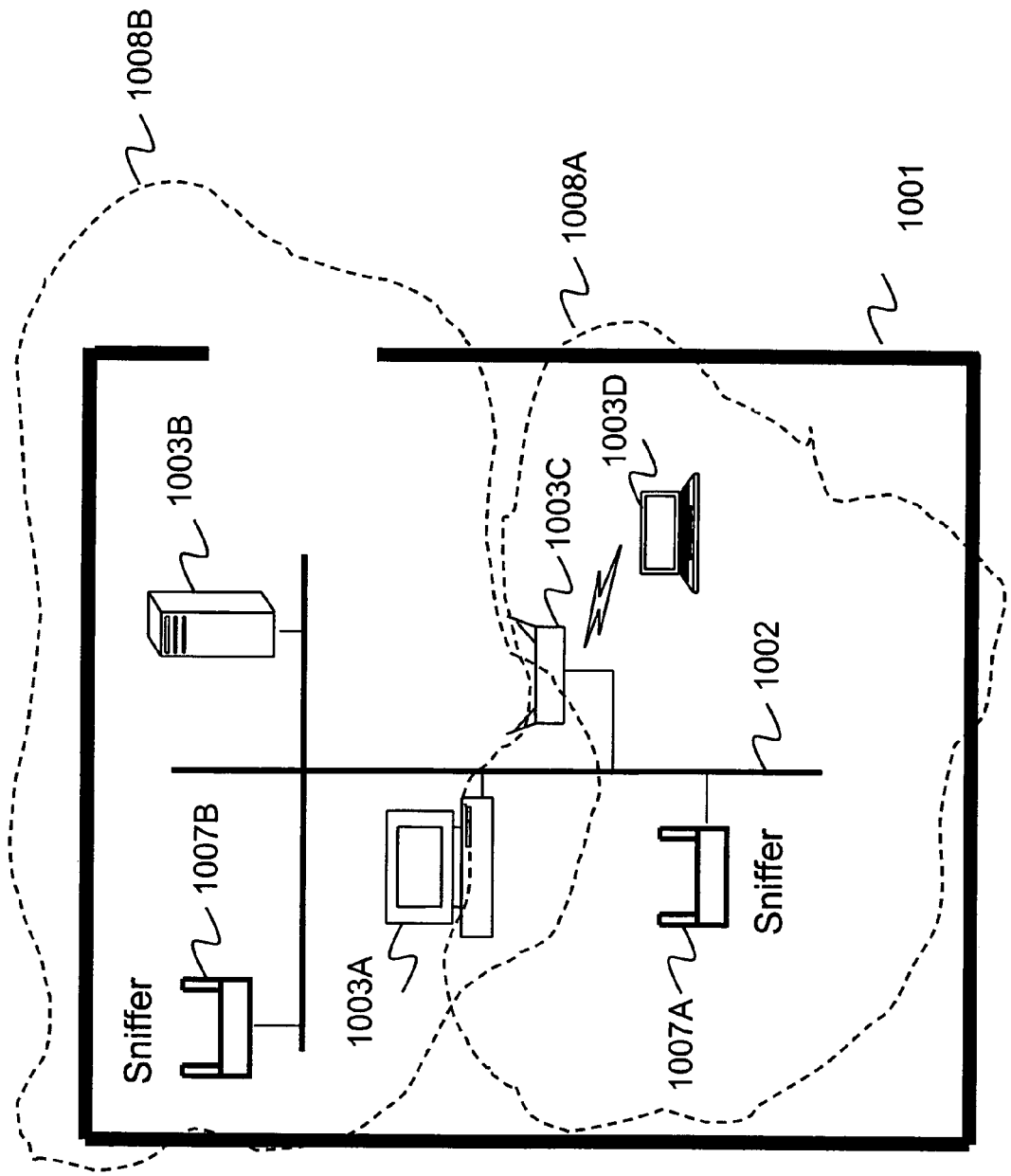
FIG. 10B shows a simplified system diagram of certain standalone intrusion detection system according to an embodiment of the present invention.

FIG. 10A shows a simplified system diagram of certain conventional intrusion detection system including client-server architecture, and FIG. 10B shows a simplified system diagram of certain standalone intrusion detection system according to an embodiment of the present invention. This diagram is merely an example, which should not unduly limit the scope of the claims herein. One of ordinary skill in the art would recognize other variations, modifications, and alternatives. As shown, a selected local geographic region 1001 (e.g. office, building, apartment etc.) comprises one or more segments of local area network (LAN) 1002. Plurality of computer systems, for example, a PC 1003A, an application server 1003B (e.g. email server), a wireless AP 1003C and a wireless laptop 1003D, are coupled to the LAN 1002.

As shown in FIG. 10A, certain conventional intrusion detection system comprises one or more sniffer devices 1004A, 1004B coupled to the LAN 1002 and a server device 1005 coupled to the LAN 1002. Depending upon the embodiment, the server device can be a dedicated server appliance or it can be a general purpose computer which runs software process directed to perform server functionality. In a specific embodiment, the sniffer devices 1004A and 1004B interact with the server device 1005 to perform intrusion detection, prevention and like. Each of the sniffer devices 1004A and 1004B have a radio coverage 1006A and 1006B respectively associated with it. Preferably, the sniffer device can detect wireless activity within its radio coverage.

As shown in FIG. 10B, the standalone intrusion detection system according to present invention comprises one or more wireless sniffer devices 1007A, 1007B coupled to the LAN 1002. Preferably, the system is free from a server device (e.g. such as 1005). Each of the sniffer devices 1007A and 1007B have a radio coverage 1008A and 1008B respectively associated with it. Preferably, the sniffer device can detect wireless activity within its radio coverage. As merely an example, each of the sniffer devices 1007A and 1007B can send email notifications to a PC 1003A or to an email server (e.g. 1003B).

Figure 11A:
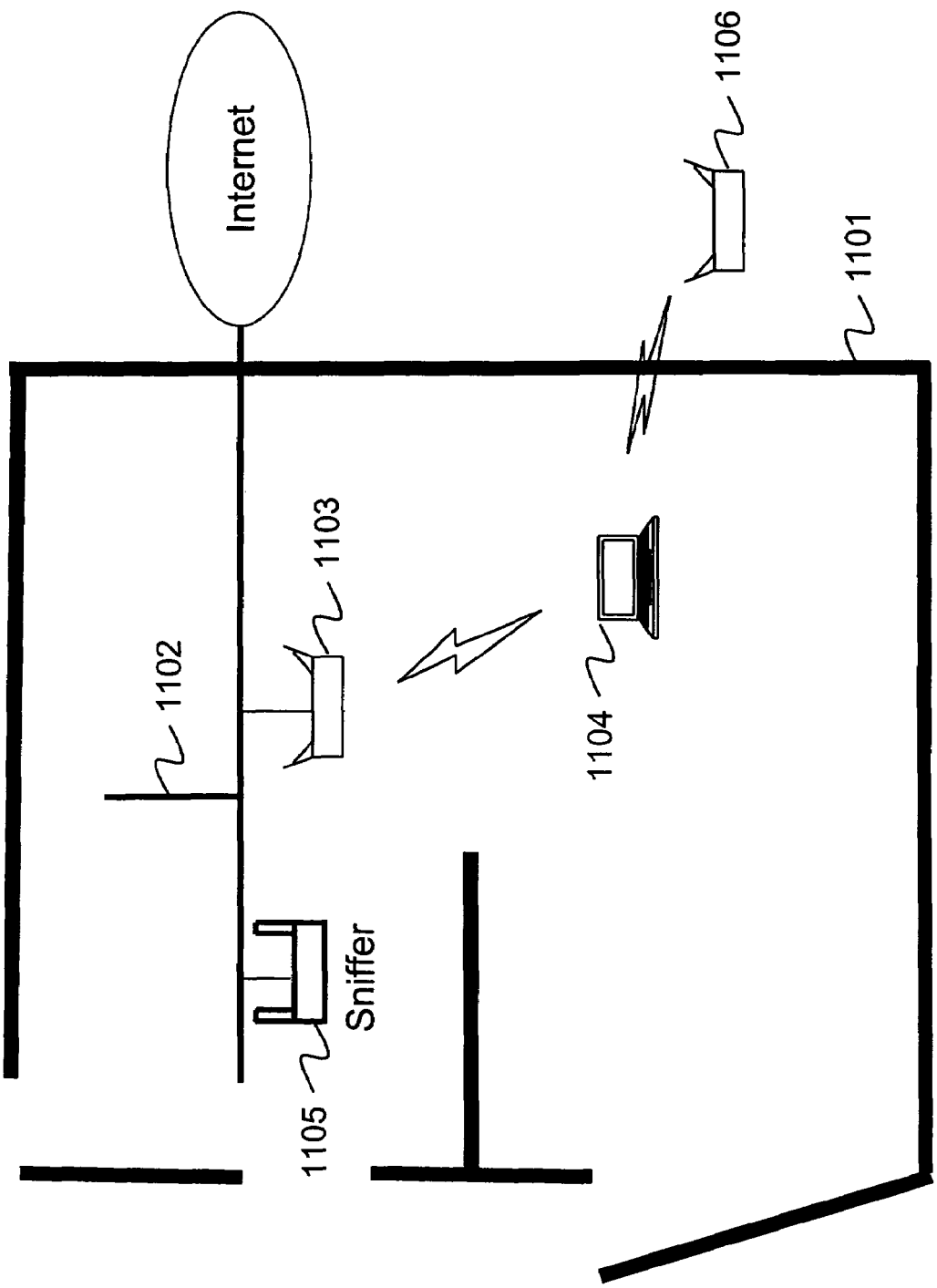
FIG. 11A shows a simplified system diagram of certain standalone intrusion detection system for protecting hot-spot wireless network according to an embodiment of the present invention.

FIG. 11A shows a simplified system diagram of certain standalone intrusion detection system for protecting hot-spot wireless network according to an embodiment of the present invention. This diagram is merely an example, which should not unduly limit the scope of the claims herein. One of ordinary skill in the art would recognize other variations, modifications, and alternatives. As shown, a hot-spot region 1101 (e.g. airport, coffee shop, mall etc.) comprises wireless LAN to provide wireless Internet access to mobile users who visit the hot-spot region. The wireless LAN comprises a wired portion 1102 to which one or more authorized APs 1103 are connected. Mobile user such as laptop 1104 can connect to the authorized AP 1103 and access the Internet through it. A malicious AP 1106 can launch wireless attacks on the wireless LAN. As merely an example, the AP 1106 can advertise the same SSID (service set identifier) as that of the authorized AP 1103 and thus lure the laptop 1104 into wirelessly connecting to it. The AP 1106 can then display a login and password page on the laptop through this wireless connection. The user of laptop 1104 can unwittingly type in login and password on the displayed page, thereby disclosing this information to the AP 1106. As another example, the AP 1106 can insert itself as man-in-the-middle after the laptop 1104 wirelessly connects to it. Many such attacks including Honeypot AP attack, Evil Twin attack, AirJack attack, hotspooter tool attack can be launched using the AP 1106.

Figure 11B:
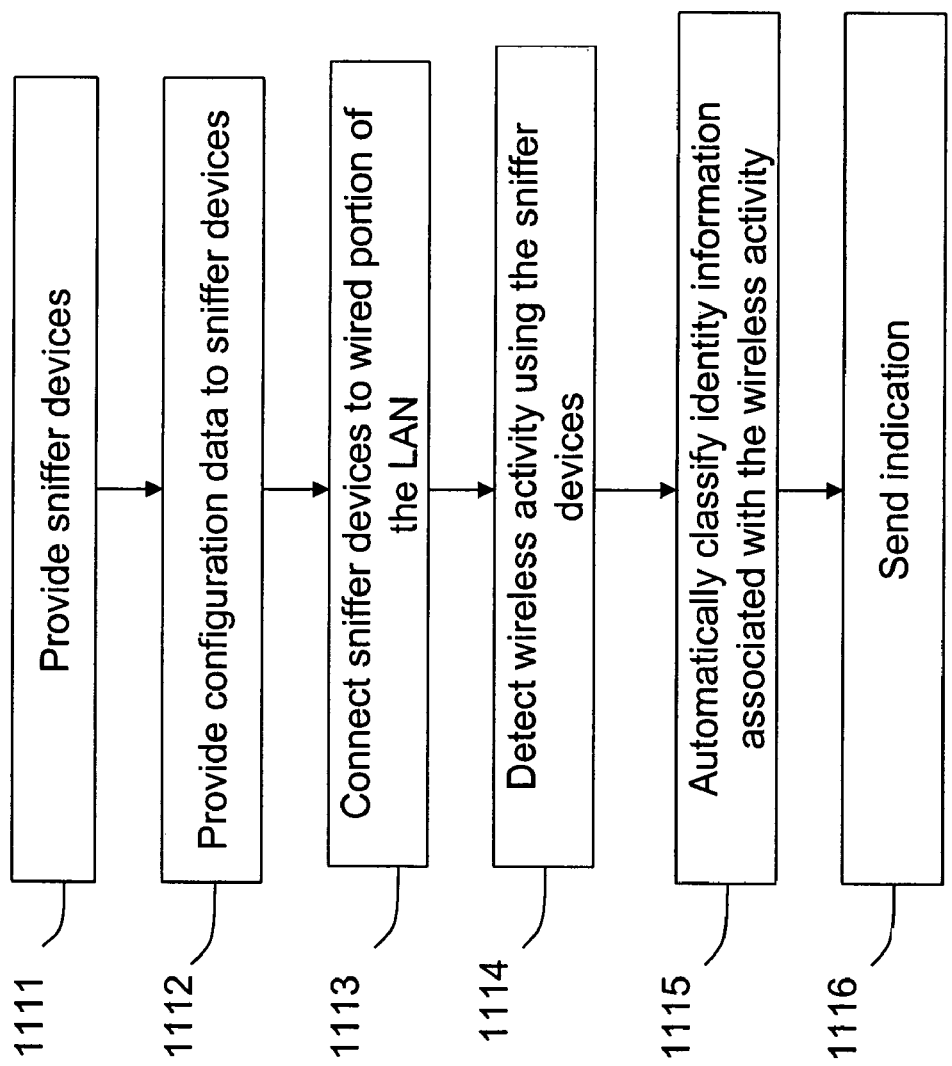
FIG. 11B shows a simplified flowchart of method for protecting hot-spot wireless network according to an embodiment of the present invention.

One or more sniffer devices 1105 can be connected to the wired portion 1102 in order to protect the wireless LAN within the hot-spot from these and other wireless attacks. FIG. 11B shows a simplified flowchart of method for protecting hot-spot wireless network according to an embodiment of the present invention. This diagram is merely an example, which should not unduly limit the scope of the claims herein. One of ordinary skill in the art would recognize other variations, modifications, and alternatives.

As shown, step 1111 can provide one or more sniffer devices. Step 1112 can provide configuration data to sniffer devices. In one embodiment, the configuration data includes email address or Internet address of intended recipient of indications sent from the sniffer device. In another embodiment, the configuration data includes identity information associated with the authorized APs 1103. For example, the identity information comprises SSID information. As another example, the identity information comprises MAC addresses of authorized APs 1103. In one embodiment, the configuration data is provided to the sniffer device by coupling the device to computer system (e.g. using serial cable, Ethernet cable or over one or more computer networks).

Step 1113 comprises connecting at least one of the sniffers to the wired portion 1102 of the wireless LAN. Step 1114 comprises detecting wireless activity (e.g. within and in the vicinity of hot-spot region 1101) using the sniffers. For example, the presence of APs 1103 and AP 1106 can be detected by the sniffer device 1105 by detecting the beacon frames or probe response frames transmitted from these APs over the wireless medium.

Step 1115 comprises automatically classifying identity information associated with the detected wireless activity. For example, the AP 1106 can be categorized by the sniffer device as external after performing the LAN connectivity test. The APs 1103 can be categorized as authorized.

Step 1116 can send indication associated the identify information. In one embodiment, the sniffer device can determine that the AP 1106 is not connected to the wired portion 1102 (i.e. external), still advertises the same SSID as APs 1103. The sniffer device can thus infer that the AP 1106 is malicious and send indication including MAC address of the AP 1106 to a prevention process. In another embodiment, the sniffer device can send indication to an email address or an Internet address.

The above methods and systems are provided according to embodiments of the present invention. As shown, the method uses a combination of steps including a way of detecting for an intrusion using wireless computer networks using a sniffer apparatus. In preferred embodiments, the present invention also includes an apparatus having an automated method for transferring an indication of an intrusion to a prevention process, which would preferably stop the intruding device before any security problems or the like. Many other methods and system are also included. Of course, other alternatives can also be provided where steps are added, one or more steps are removed, or one or more steps are provided in a different sequence without departing from the scope of the claims herein. Additionally, the various methods can be implemented using a computer code or codes in software, firmware, hardware, or any combination of these. Depending upon the embodiment, there can be other variations, modifications, and alternatives.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. An apparatus for intrusion detection in wireless communication networks, the apparatus comprising:
 a single housing, the housing comprising;
 a processing unit;
 one or more wireless network interface devices coupled to the processing unit;
 at least one network interface device coupled to the processing unit, the at least one network interface device being adapted to operably couple the housing to a local area network to be protected from intrusion, the local area network comprising a wired portion; and one or more memories coupled to the processing unit, the one or more memories including:

one or more codes directed to perform a process for detection of wireless activities within a selected local geographic region, the wireless activities being associated with at least a first wireless access point, a second wireless access point, and a third wireless access point, respectively, the wireless activities being received using at least one of the one or more wireless network interface devices, the first wireless access point being an authorized wireless access point, the second wireless access point being a first other than authorized wireless access point that is connected into the wired portion of the local area network to be protected from intrusion, and the third wireless access point being a second other than authorized wireless access point that is not connected into the wired portion of the local area network to be protected from intrusion;

one or more codes directed to deriving from the wireless activities at least a first identifier, a second identifier, and a third identifier associated with the first wireless access point, the second wireless access point, and the third wireless access point, respectively;

one or more codes directed to originating one or more first marker packets, the one or more first marker packets adapted for use in inferring a connectivity status of at least the second wireless access point and the third wireless access point, the connectivity status being related to a status of being connected to the wired portion of the local area network to be protected from intrusion or a status of being not connected to the wired portion of the local area network to be protected from intrusion;

one or more codes directed to receiving one or more second marker packets, the one or more second marker packets adapted for use in inferring the connectivity status of at least the second wireless access point and the third wireless access point;

one or more codes directed to classifying the at least the first identifier, the second identifier, and the third identifier into an authorized category, an unauthorized category, and an external category, respectively, wherein classifying is based, in part, on the connectivity status of the at least the second wireless access point and the third wireless access point; and one or more codes directed to initiating a prevention process, the prevention process including disrupting at least a portion of wireless communication associated with the second wireless access point by transmitting one or more wireless signals from at least one of the one or more wireless network interface devices;

whereupon the codes directed to perform the process for detection, the deriving from the wireless activities, the originating the one or more first marker packets, the receiving the one or more second marker packets, the classifying into the categories, and the initiating the prevention process are all entirely executed within the processing unit.

2. The apparatus of claim 1 wherein execution of the codes directed to perform the process for detection, the deriving from the wireless activities, the originating the one or more first marker packets, the receiving the one or more second marker packets, the classifying into the categories, and the initiating the prevention process within the processing unit is free from any interaction over a computer network with a sewer device.

3. The apparatus of claim 1 wherein the apparatus is operable as stand alone.

4. The apparatus of claim 1 wherein the single housing comprises one or more modules connected together.

5. The apparatus of claim 1 wherein the single housing is a portable device.

6. The apparatus of claim 1 further comprising one or more codes directed to performing the prevention process, the one or more codes being in the one or more memones.

7. The apparatus of claim 1 further comprising one or more codes directed to transferring an indication associated with at least the second wireless access point to one or more computer systems.

8. The apparatus of claim 7 wherein the transferring includes sending an electronic mail.

9. The apparatus of claim 1 further comprising one or more add on components attached to the housing.

10. The apparatus of claim 9 wherein the one or more add on components include one or more antennas coupled to the one or more wireless network interface devices.

11. The apparatus of claim 10 wherein the one or more antennas are coupled to the one or more wireless network interface devices using one or more wires.

12. The apparatus of claim 9 wherein the add on components include one or more memory devices adapted to be coupled to the processing unit.

13. The apparatus of claim 1 wherein the processing unit comprises one or more microprocessors.

14. The apparatus of claim 1 wherein the at least one network interface device includes an Ethernet network interface device.

15. The apparatus of claim 1 further comprising one or more codes directed to transmitting at least one of the one or more first marker packets through at least one of the one or more wireless network interface devices, the one or more codes being in the one or more memories.

16. The apparatus of claim 1 further comprising one or more codes directed to transmitting at least one of the one or more first marker packets through the at least one network interface device, the one or more codes being in the one or more memories.

17. The apparatus of claim 1 further comprising one or more codes directed to receiving at least one of the one or more second marker packets through at least one of the one or more wireless network interface devices, the one or more codes being in the one or more memories.

18. The apparatus of claim 1 further comprising one or more codes directed to receiving at least one of the one or more second marker packets through the at least one network interface device, the one or more codes being in the one or more memories.

19. The apparatus of claim 1 further comprising one or more codes directed to inferring the connectivity status of at least the second wireless access point as the status of being connected to the wired portion of the local area network to be protected from intrusion, based on information associated with at least one of the one or more first marker packets and at least one of the one or more second marker packets, respectively, the at least one of the one or more first marker packets being received by the second wireless access point, the at least one of the second marker packets being transmitted by the second wireless access point, the one or more codes being in the one or more memories.

20. The apparatus of claim 19 wherein the at least one of the second marker packets being transmitted by the second wireless access point is derived from the at least one of the one or more first marker packets being received by the second wireless access point.

21. The apparatus of claim 19 wherein the information associated with the at least one of the one or more first marker packets and the at least one of the one or more second marker packets, respectively, include format information.

22. A method of protecting one or more local area networks within a selected local geographic region from intrusion, the method comprising:
providing one or more wireless sniffer apparatuses, each wireless sniffer apparatus comprising:
a single housing, the housing comprising;
a processing unit;
one or more wireless network interface devices coupled to the processing unit;
at least one network interface device coupled to the processing unit, the at least one network interface device being adapted to operably couple the housing to the one or more local area networks to be protected from intrusion, the one or more local area networks including a wired portion; and
one or more memories coupled to the processing unit;
placing the one or more of the wireless sniffer apparatuses spatially to provide sniffer radio coverage over at least a portion of region including the selected local geographic region, the selected local geographic region comprising the one or more local area networks;
coupling the one or more wireless sniffer apparatuses to the one or more local area networks;
detecting wireless activities, the wireless activities being associated with at least a first wireless access point, a second wireless access point, and a third wireless access point, respectively, the wireless activities being received using at least one of the one or more wireless network interface devices, the first wireless access point being an authorized wireless access point, the second wireless access point being a first other than authorized wireless access point that is connected to the wired portion of the local area network to be protected from intrusion, and the third wireless access point being a second other than authorized wireless access point that is not connected to the wired portion of the local area network to be protected from intrusion;
deriving from the wireless activities at least a first identifier, a second identifier, and a third identifier associated with the first wireless access point, the second wireless access point, and the third wireless access point, respectively;
originating one or more first marker packets, the one or more first marker packets adapted for use in inferring a connectivity status of at least the second wireless access point and the third wireless access point, the connectivity status being related to a status of being connected to the wired portion of the local area network to be protected from intrusion or a status of being not connected to the wired portion of the local area network to be protected from intrusion;
receiving one or more second marker packets, the one or more second marker packets adapted for use in inferring the connectivity status of the at least the second wireless access point and the third wireless access point;
classifying the at least the first identifier, the second identifier, and the third identifier into an authorized category, an unauthorized category, and an external category, respectively, wherein classifying is based, in part, on the connectivity status of the at least the second wireless access point and the third wireless access point; and
initiating a first prevention process, the first prevention process including disrupting at least a portion of wireless communication associated with the second wireless access point by transmitting one or more wireless signals from at least one of the one or more wireless network interface devices.

23. The method of claim 22 wherein the at least one network interface device includes an Ethernet interface device and coupling the one or more wireless sniffer apparatuses comprises plugging an Ethernet connection from the one or more local area networks into the at least one network interface device.

24. The method of claim 22 wherein coupling the one or more wireless sniffer apparatuses comprises plugging an electrical connection into at least one of the one or more wireless sniffer apparatuses to provide electrical power to the at least one wireless sniffer apparatus.

25. The method of claim 22 further comprising removing at least one of the one or more wireless sniffer apparatuses from an enclosure, the enclosure providing a packaging material to protect the at least one wireless sniffer apparatus.

26. The method of claim 22 wherein the detecting the wireless activities, the deriving from the wireless activities, the originating the one or more first marker packets, the receiving the one or more second marker packets, the classifying, and the initiating the first prevention process are all entirely performed within the processing unit.

27. The method of claim 22 wherein a finite radio coverage is associated with each wireless sniffer apparatus.

28. The method of claim 22 further comprising providing configuration data to at least one of the one or more wireless sniffer apparatuses by coupling the at least one wireless sniffer apparatus to a computer system.

29. The method of claim 28 wherein the configuration data includes identity information associated with the authorized wireless access point.

30. The method of claim 28 further comprising transferring an indication associated with at least the second wireless access point to one or more computer systems using electronic mail and wherein the configuration data includes electronic mail address of the recipient of the indication.

31. The method of claim 22 wherein the selected local geographic region includes at least a portion of an office space.

32. The method of claim 22 wherein the selected local geographic region includes at least a portion of a wireless Internet access hot-spot.

33. The method of claim 22 further comprising ascertaining that the third wireless access point inflicts a wireless security attack.

34. The method of claim 33 further comprising initiating a second prevention process, the second prevention process including disrupting at least a portion of wireless communication associated with the wireless security attack by transmitting one or more wireless signals from at least one of the one or more wireless network interface devices.

35. The method of claim 33 wherein the wireless security attack includes at least one of a Honeypot AP attack, an Evil Twins attack, a MonkeyJack attacks, or a hotspotter tool attack.

36. The method of claim 22 wherein the one or more local area networks include a wireless portion.

37. The apparatus of claim 1 wherein the one or more codes directed to perform the process of detection of the wireless activities, the one or more codes directed to the deriving from the wireless activities, the one or more codes directed to the originating the one or more first marker packets, the one or more codes directed to the receiving the one or more second marker packets, the one or more codes directed to the classifying, and the one or more codes directed to the initiating the prevention process, all execute free from human interaction using an initial configuration data.

38. The apparatus of claim 37 wherein the initial configuration data comprises a configuration data including identity information associated with the authorized wireless access point.

39. The apparatus of claim 1 wherein the one or more codes directed to perform the process of detection of the wireless activities, the one or more codes directed to the deriving from the wireless activities, the one or more codes directed to the originating the one or more first marker packets, the one or more codes directed to the receiving the one or more second marker packets, the one or more codes directed to the classifying, and the one or more codes directed to the initiating the prevention process, all execute free of interaction with a server device after an initial configuration data is provided.

40. The apparatus of claim 1 wherein the process of classifying comprises:
 a first process of classifying into a category selected from a plurality of categories and a grouping including remaining categories of the plurality of categories, the plurality of categories including the authorized category, the unauthorized category, and the external category; and
 a second process of classifying the grouping into the remaining categories of the plurality of categories.

41. The apparatus of claim 40 wherein the category selected from the plurality of categories being the authorized category and the grouping including the unauthorized category and the external category.

42. The method of claim 22 wherein the detecting the wireless activities, the deriving from the wireless activities, the originating the one or more first marker packets, the receiving the one or more second marker packets, the classifying, and the initiating the first prevention process are all performed free from human interaction after an initial configuration process.

43. The method of claim 42 wherein the initial configuration process comprises coupling at least one of the one or more wireless sniffer apparatuses to the one or more local area networks to be protected from intrusion and providing configuration data including identity information associated with the authorized wireless access point.

44. The method of claim 22 wherein the detecting the wireless activities, the deriving from the wireless activities, the originating the one or more first marker packets, the receiving the one or more second marker packets, the classifying, and the initiating the first prevention process are all performed free of interaction with a server device after an initial configuration process.

45. The method of claim 22 wherein the classifying comprises:
 a first process of classifying into a category selected from a plurality of categories and a grouping including remaining categories of the plurality of categories, the plurality of categories including the authorized category, the unauthorized category, and the external category; and
 a second process of classifying the grouping into the remaining categories of the plurality of categories.

46. The method of claim 45 wherein the category selected from the plurality of categories being the authorized category and the grouping including the unauthorized category and the external category.

47. The apparatus of claim 11 wherein at least one of the one or more antennas is mounted on the housing.

48. The apparatus of claim 11 wherein at least one of the one or more antennas is placed separated from the housing.

49. The method of claim 22 wherein the detecting the wireless activities, the deriving from the wireless activities, the originating the one or more first marker packets, the receiving the one or more second marker packets, the classifying, and the initiating the first prevention process are all entirely performed free from interaction over a computer network with a server device.

50. The method of claim 22 wherein at least one of the one or more first marker packets has a format.

51. The method of claim 50 wherein the format comprises an identifiable format, the identifiable format comprising an identifiable pattern, an identifiable size, or both.

52. The method of claim 22 wherein at least one of the one or more second marker packets has a format.

53. The method of claim 52 wherein the format comprises an identifiable format, the identifiable format comprising an identifiable pattern, an identifiable size, or both.

* * * * *